US007875698B2

(12) United States Patent
Vanmaele et al.

(10) Patent No.: US 7,875,698 B2
(45) Date of Patent: *Jan. 25, 2011

(54) POLYMERIC INITIATORS

(75) Inventors: Luc Vanmaele, Lochristi (BE); Johan Loccufoer, Zwijnaarde (BE); Yu Chen, Mainz (DE); Holger Frey, Emmendingen (DE)

(73) Assignee: Agfa Graphics NV, Mortsel (BE)

( * ) Notice: Subject to any disclaimer, the term of this patent is extended or adjusted under 35 U.S.C. 154(b) by 1116 days.

This patent is subject to a terminal disclaimer.

(21) Appl. No.: 11/169,249

(22) Filed: Jun. 28, 2005

(65) Prior Publication Data

US 2006/0014850 A1 Jan. 19, 2006

Related U.S. Application Data

(60) Provisional application No. 60/602,105, filed on Aug. 17, 2004.

(30) Foreign Application Priority Data

Jul. 15, 2004 (EP) ................................. 04103387

(51) Int. Cl.
C08F 2/46 (2006.01)
C09D 11/10 (2006.01)
(52) U.S. Cl. ........................ 528/403; 528/405; 528/408; 528/107; 528/109; 528/118; 528/404
(58) Field of Classification Search ................. 525/118, 525/404
See application file for complete search history.

(56) References Cited

U.S. PATENT DOCUMENTS

| 4,124,389 | A | * | 11/1978 | Hoornstra et al. ........... 430/306 |
| 4,857,630 | A | | 8/1989 | Kim |
| 5,196,502 | A | | 3/1993 | Turner et al. |
| 5,214,122 | A | | 5/1993 | Turner et al. |
| 5,225,522 | A | | 7/1993 | Turner et al. |
| 5,506,279 | A | | 4/1996 | Babu et al. |
| 5,538,548 | A | | 7/1996 | Yamazaki |
| 6,087,412 | A | | 7/2000 | Chabrecek et al. |
| 6,114,458 | A | * | 9/2000 | Hawker et al. ............... 525/242 |
| 6,300,388 | B1 | | 10/2001 | Verdonck et al. |
| 6,310,115 | B1 | | 10/2001 | Vanmaele et al. |
| 6,716,948 | B1 | * | 4/2004 | Klaerner et al. .......... 526/303.1 |
| 6,765,082 | B2 | * | 7/2004 | Sunder et al. ................ 528/409 |
| 2006/0183865 | A1 | * | 8/2006 | Percec ........................ 525/242 |

FOREIGN PATENT DOCUMENTS

| DE | 19947631 A1 | | 6/2000 |
| GB | 2339202 | * | 1/2000 |
| JP | 58198429 A2 | | 11/1983 |
| JP | 61043627 | | 3/1986 |
| WO | WO 96/14346 A1 | | 5/1996 |
| WO | WO 97/17378 A1 | | 5/1997 |
| WO | WO 97/49664 A1 | | 12/1997 |
| WO | WO 03/033452 A1 | | 4/2003 |
| WO | WO 03/033492 A1 | | 4/2003 |
| WO | WO 03/064502 A1 | | 8/2003 |
| WO | WO 03/007268 | * | 9/2003 |
| WO | WO 2005092282 A1 | | 10/2005 |

OTHER PUBLICATIONS

Aydin, M. et al.; *Macromolecular Rapid Communications*; vol. 24, No. 12; pp. 718-723 (2003).
Burchard, W.; Solution properties of branched macromolecules. *Advanced in Polymer Science*; vol. 143, No. II; pp. 113-194 (1999).
Corrales, T. et al.; Free radical macrophotoinitiators: an overview on recent advances; *Journal of Photochemistry and Photobiology A: Chemistry*; vol. 159, No. 2; pp. 103-114 (2003).
Crivello, J.V. et al.; Photoinitiators for Free Radical Cationic and Anionic Photopolymerization; *Surface Coatings Technology*; vol. III; pp. 208-224 (1998).
Dworak, A. et al.; Cationic polymerization of glycidol; *Macromolecular Chemistry and Physics*; vol. 196, No. 6; pp. 1963-1970 (1995).
Flory, P.J.; Molecular size distribution in three-dimensional polymers; *Journal of the American Chemical Society*; vol. 74; pp. 2718-2723 (1952).
Frechet, J; Self-condensing vinyl polymerization: an approach to dendritic materials; *Science*; vol. 269, No. 5227; pp. 1080-1083 (1995).
Frey, H. et al.; Degree of branching in hyperbranched polymers; *Acta Polymerica*; vol. 50; pp. 67-76 (1999).
Gao, C. et al.; Hyperbranched polymers: from synthesis to application; *Progress in Polymer Science*; vol. 29, No. 3; pp. 183-275 (2000).
Hanselmann, R. et al; Hyperbranched Polymers Prepared via the Core-Dilution/Slow Addition Technique: Computer Simulation of Molecular Weight Distribution and Degree of Branching; *Macromolecules*; vol. 31, No. 12; pp. 3790-3801 (1998).
Hawker et al.; Preparation of polymers with controlled molecular architecture; *J. Am. Chem. Soc.*; vol. 112; p. 7638 (1990).
Holter, D. et al.; Degree of branching in hyperbranched polymers; *Acta Polymerica*; vol. 23, No. 48; pp. 30-35 (1997).
Holter, E.J. et al.; Degree of branching in hyperbranched polymers; *Acta Polymerica*; vol. 48, No. 8; pp. 298-309 (1997).
Jikei, M.; Hyperbranched polymers: a promising new class of materials; *Progress in Polymer Science*; vol. 26, No. 8; pp. 1233-1285 (2001).
Kim, Y. et al.; Hyperbranched polymers 10 years after; *Journal of Polymer Science, Part A: Polymer Chemistry*; vol. 36, No. 11; pp. 1685-1698 (1998).

(Continued)

*Primary Examiner*—Irina S Zemel
(74) *Attorney, Agent, or Firm*—Leydig, Voit & Mayer, Ltd.

(57) ABSTRACT

A novel polymeric initiator is disclosed comprising a dendritic polymer core with at least one initiating functional group as an end group. The dendritic polymeric core is preferably a hyperbranched polymer. The polymeric initiators are useful in radiation curable compositions such as varnishes, lacquers and printing inks and are especially useful in radiation curable inkjet inks.

8 Claims, No Drawings

OTHER PUBLICATIONS

Kim, Y.H et al.; Hyperbranched polyphenylenes. *Polymer Preprints (American Chemical Society, Division of Polymer Chemistry*; vol. 29, No. 2, pp. 310-311 (1988).

Maier, S. et al; Synthesis of poly(glycerol)-block-poly(methyl acrylate) multi-arm star polymers; *Macromolecular Rapid Communications*; vol. 21, No. 5; pp. 226-230 (2000).

Mc Cutcheon; Functional Materials, North American Edition; Glen Rock, N.J.: Manufacturing Confectioner Publishing Co.; pp. 110-129 (1990).

Radke, W. et al.; Effect of Core-Forming Molecules on Molecular Weight Distribution and Degree of Branching in the Synthesis of Hyperbranched Polymers; *Macromolecules*; vol. 31, No. 2; pp. 239-248 (1998).

Sunder, A. et al.; Controlled Synthesis of Hyperbranched Polyglycerols by Ring-Opening Multibranching Polymerization; *Macromolecules*; vol. 32, No. 13; pp. 4240-4246 (1999).

Sunder, A. et al.; Controlling the growth of polymer tress: concepts and perspectives for hyperbranched polymers; *Chemistry- A European Journal*; vol. 6, No. 14; pp. 2499-2506 (2000).

Sunder, A. et al.; Hyperbranched Polyether-Polyols Based on Polyglycerol: Polarity Design by Block Copolymerization with Propylene Oxide; *Macromolecules*; vol. 33, No. 2; pp. 309-314 (2000).

Tokar, R. et al.; Cationic polymerization of glycidol: coexistence of the activated monomer and active chain end mechanism; *Macromolecules*; vol. 27; p. 320 (1994).

Tomalia et al.; A new class of polymers: starburst-dendritic macromolecules. *Polymer J.*; vol. 17; p. 117 (1985).

Vandenberg, E.J.; Polymerization of glycidol and its derivatives: a new rearrangement polymerization; *Journal of Polymer Science*; vol. 23, No. 4; pp. 915-949 (1985).

Voit, B. et al.; New Developments in hyperbranched polymers; *Journal of Polymer Science, Part A: Polymer Chemistry*; vol. 38, No. 14; pp. 2505-2525 (2000).

European Search Report in 04 10 3389 (Sep. 6, 2005).

Pouliquen et al.; "Functionalized Polysiloxanes with Thioxanthobe Side Groups: A Study of Their Reactivity as Radical Polymerization;" *Macromolecules*; vol. 28 No. 24; pp. 8028-8034 (Nov. 20, 1995).

* cited by examiner

POLYMERIC INITIATORS

CROSS-REFERENCE TO RELATED PATENT APPLICATIONS

This application claims the benefit of U.S. Provisional Application No. 60/602,105 filed Aug. 17, 2004, which is incorporated by reference. In addition, this application claims the benefit of European Application No. 04103387 filed Jul. 15, 2004, which is also incorporated by reference.

TECHNICAL FIELD

The present invention relates to novel polymeric initiators, useful in radiation curable compositions such as varnishes, lacquers and printing inks, e.g. radiation curable inkjet inks.

BACKGROUND ART

Commercial radiation curable inkjet inks contain significant amounts of low molecular weight photo-initiators. Especially Norrish type II-initiators such as isopropyl thioxanthone or benzophenone derivatives are prone to diffuse out of the curable composition even after curing, as they are not built into the polymer network. This tendency to migrate and the possibility of being extracted into the food makes them less suitable for application in inks for food packaging. Norrish type I initiators are normally built into the network, except when the quantum efficiency for cleavage is less than unity or when side reactions occur yielding extractable degradation products. Unreacted initiators may also deteriorate the physical properties of the packaging material.

One approach to solve these problems is to design initiators with a higher molecular weight.

Polymeric initiators have been disclosed in CRIVELLO, J. V., et al. Photoinitiators for Free Radical Cationic and Anionic Photopolymerisation. *Surface Coatings Technology.* 1998, vol. III, p. 208-224. and CORRALES, T., et al. Free radical macrophotoinitiators: an overview on recent advances. *Journal of Photochemistry and Photobiology A: Chemistry.* 2003, vol. 159, no. 2, p. 103-114. All the disclosed polymeric initiators have a conventional linear molecular geometry. The solution viscosity of a radiation curable composition is influenced significantly using these polymeric initiators. Especially in ink jet applications, a significant increase in the solution viscosity has to be avoided to keep the inkjet ink jettable.

Some multifunctional initiators for food applications have been disclosed. WO 03033452 (COATES BROTHERS PLC) discloses multifunctional benzophenone initiators having the following general structure:

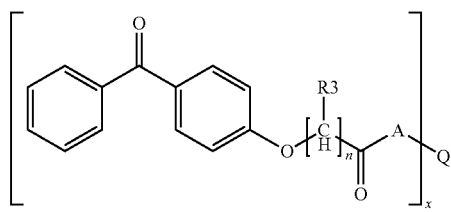

where n is a number from 1 to 6; R3 is hydrogen, methyl or ethyl; A represents a group of formula —[O(CHR$^2$CHR$^1$)$_a$]$_y$—, —[O(CH$_2$)$_b$CO]$_y$, or —[O(CH$_2$CO]$_{(y-1)}$—[O(CHR$^2$CHR$^1$)$_a$]— (where one of R$^1$ and R$^2$ is hydrogen and the other is hydrogen, methyl or ethyl); a is from 1 to 2; b is from 4 to 5; y is from 3 to 10; Q is a residue of a polyhydroxy compound having 2 to 6 hydroxyl groups; and x is greater than 1 but no greater than the number of available hydroxyl groups in Q.

WO 03033492 (COATES BROTHERS PLC) discloses similar polymeric initiators having the following structure

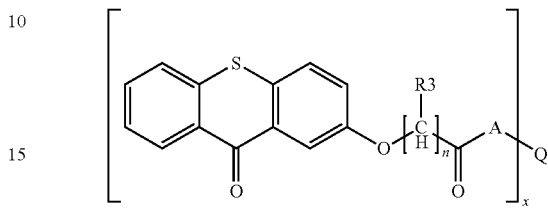

where n is a number from 1 to 6; R3 is hydrogen, methyl or ethyl; A represents a group of formula —[O(CHR$^2$CHR$^1$)$_a$]$_y$—, —[O(CH$_2$)$_b$CO]$_y$, or —[O(CH$_2$CO]$_{(y-1)}$—[O(CHR$^2$CHR$^1$)$_a$]— (where one of R$^1$ and R$^2$ is hydrogen and the other is hydrogen, methyl or ethyl); a is from 1 to 2; b is from 4 to 5; y is from 3 to 10; Q is a residue of a polyhydroxy compound having 2 to 6 hydroxyl groups; and x is greater than 1 but no greater than the number of available hydroxyl groups in Q.

Both WO 03033452 (COATES BROTHERS PLC) and WO 03033492 (COATES BROTHERS PLC) teach that the molecular weight of the multifunctional initiators is most preferably lower than 800, since higher molecular weights cause an unwanted increase in the viscosity of the radiation curable formulation. This limits the functionality of the multifunctional initiator and limits the possibilities to optimize physical properties, such as the compatibility with different radiation curable compositions, to the choice of Q. Using part of the hydroxyl groups of the core to introduce moieties for optimization of physical properties would lead to multifunctional initiators with a low functionality. High concentrations of photoinitiators would then be needed to obtain the required curing sensitivity, thus limiting the possibilities for the composition and having a large influence on the properties of the composition and the final result.

WO 9717378 (COATES BROTHERS PLC) discloses a different type of multifunctional initiators obtained by the reaction of a multifunctional core material containing two or more reactive groups and a photoinitiator or derivative thereof. The photoinitiator or derivative thereof has a reactive group capable of reacting with the reactive groups of the multifunctional core. The photoinitiators disclosed in WO 9717378 (COATES BROTHERS PLC) are low molecular weight compounds, having a maximum functionality of 6. Depending on the functionality of the polyfunctional initiator, the molecular weight of the core is preferably less than 500 for a difunctional initiator, preferable less than 1000 for a tetrafunctional initiator and less than 1500 for a hexafunctional initiator. For inkjet applications, a further increase of molecular weight would lead to an unacceptable viscosity of the radiation curable inkjet ink.

WO 9749664 (LAMBSON FINE CHEMICALS) discloses a photoinitiator, comprising a photoreactive portion and a pendant group, the photoreactive portion including an aromatic moiety and the pending group incorporating at least one optionally substituted poly(alkylene glycol) moiety. Preferred photoreactive portions include optionally substituted benzophenone, thioxanthone and anthraquinone compounds substituted by a polyethylene glycol or polypropylene glycol moiety of an average molecular weight in the range 150 to 900. These types of initiators are essentially monofunctional. The molecular weight per photoreactive moiety is high. For an equal molar initiator concentration, a high weight percentage of these macromolecular initiators are required compared to their low molecular weight counterparts. As a result a high amount of unreactive polymer is introduced in the radiation curable formulation, having a negative influence on physical properties such as scratch resistance.

There is therefore a need to provide improved initiators that combine a high functionality with a limited influence on viscosity. These initiators should also be suitable for radiation curable compositions to be used on food packaging materials, whereby the initiators can not be extracted into the food or deteriorate the physical properties of the packaging material. The initiator should further be easy to manufacture and compatible with many different radiation curable compositions.

OBJECTS OF THE INVENTION

It is an object of the present invention to provide a new class of polymeric initiators with a high functionality and a limited influence on viscosity.

It is an another object of the present invention to provide a new class of polymeric initiators that are not extracted from a printed packaging material into the food or do not deteriorate the physical properties of the packaging material.

It is a further object of the present invention to provide a new class of polymeric initiators that are easy to manufacture.

It is a further object of the present invention to provide a radiation curable composition comprising at least one of the polymeric initiators compatible with many different radiation curable compositions.

It is still a further object of the present invention to provide a radiation curable ink jet ink suitable for inkjet printing on food packaging.

These and other objects of the invention will become apparent from the description hereinafter.

SUMMARY OF THE INVENTION

It was surprisingly found that polymeric initiators with a specific molecular geometry are at least as effective as their low molecular weight counterparts, making them especially useful for radiation curable formulations having low amounts of extractable residues. Although the polymeric initiators have a high functionality, they exhibit a limited influence on viscosity.

Objects of the present invention are realized by a polymeric initiator comprising a dendritic polymer core having at least one initiating functional group as an end group.

The objects of the present invention are also realized with a radiation curable composition containing a polymeric initiator comprising a dendritic polymer core having at least one initiating functional group as an end group.

The objects of the present invention are also realized with an inkjet ink containing a polymeric initiator comprising a dendritic polymer core having at least one initiating functional group as an end group.

The objects of the present invention are also realized with a process for manufacturing a polymeric initiator, comprising the steps of:

a) providing a dendritic polymer core, and
b) attaching at least one initiator or initiator derivative to said dendritic polymer core as an end group.

Further advantages and embodiments of the present invention will become apparent from the following description.

DETAILED DESCRIPTION OF THE INVENTION

Definitions

The term "actinic radiation" as used in disclosing the present invention, means electromagnetic radiation capable of initiating photochemical reactions.

The term "ultraviolet radiation" as used in disclosing the present invention, means electromagnetic radiation in the wavelength range of 4 to 400 nanometers.

The term "UV" is used in disclosing the present application as an abbreviation for ultraviolet radiation.

The term "initiator" as used in disclosing the present invention, means a Norrish type I initiator, a Norrish type II initiator or a photo-acid generator.

The term "Norrish Type I initiator" as used in disclosing the present invention, means an initiator which cleaves after excitation, yielding the initiating radical immediately.

The term "Norrish Type II initiator" as used in disclosing the present invention, means an initiator which is activated by actinic radiation and forms free radicals by hydrogen abstraction or electron extraction from a second compound that becomes the actual initiating free radical.

The term "photo-acid generator" as used in disclosing the present invention, means an initiator which generates a photo-acid or hemi-acid upon exposure to actinic radiation.

The term "branched polymer" as used in disclosing the present invention, means a polymer chain having branch points that connect three or more polymeric chain segments.

The term "DB" is used in disclosing the present application as an abbreviation for degree of branching.

The term "dendritic polymer" as used in disclosing the present invention, comprises dendrimers and hyperbranched polymers.

The term "hyperbranched polymer" as used in disclosing the present invention, means a polymer having a plurality of branch points and multifunctional branches that lead to further branching with polymer growth. Hyperbranched polymers are obtained by a one-step polymerization process and form a polydisperse system with varying degrees of branching (DB<100%).

The term "dendrimers" as used in disclosing the present invention, means well-defined monodisperse structures in which all branch points are used (DB=100%). Dendrimers are obtained by a multi-step synthesis.

The term "functional group" as used in disclosing the present invention, means an atom or group of atoms, acting as a unit, that has replaced a hydrogen atom in a hydrocarbon molecule and whose presence imparts characteristic properties to this molecule.

The term "low functionality" as used in disclosing the present invention, means having not more than five functional groups.

The term "end group" as used in disclosing the present invention, means the terminal group on a branch. In the case of a dendrimer or hyperbranched polymer, a plurality of end groups is present.

The term "initiating functional group" as used in disclosing the present invention, means a functional group that renders the molecule capable of functioning as an initiator.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "acyl group" as used in disclosing the present invention means

—(C═O)-aryl and —(C═O)-alkyl groups.

The term "aliphatic group" as used in disclosing the present invention means saturated straight chain, branched chain and alicyclic hydrocarbon groups.

The term "aryl group" as used in disclosing the present invention means an assemblage of cyclic conjugated carbon atoms, which are characterized by large resonance energies, e.g. benzene, naphthalene and anthracene.

The term "alicyclic hydrocarbon group" means an assemblage of cyclic conjugated carbon atoms, which do not form an aromatic group, e.g. cyclohexane.

Dendritic Polymers

The polymeric initiator according to the present invention contains a core of dendritic polymer, e.g. a dendrimer or a hyperbranched polymer. The polymeric initiator according to the present invention has preferably a core of hyperbranched polymer.

Dendrimers are characterized by cascade-type branching, i.e. a branch-on-branch topology. Dendrimers are prepared in a multi-step synthesis, based on repeated branching and deprotection schemes as disclosed by NEWCOME, G. R., et al. Dendritic Molecules: Concepts, Synthesis, Perspectives. VCH: WEINHEIM, 2001. Dendrimer synthesis strategies generally aim at fully branched polymers, although in recently reported examples a fraction of imperfectly branched species has been reported as (undesired) side-products. Suitable dendrimers are polyamidoamine (PAMAM) Starburst® dendrimers as disclosed by TOMALIA, et al. A new class of polymers: starburst-dendritic macromolecules. *Polym. J.* 1985, vol. 17, p. 117. and convergently prepared polybenzylether dendrimers as disclosed by HAWKER, et al. Preparation of polymers with controlled molecular architecture. A new convergent approach to dendritic macromolecules. *J. Am. Chem. Soc.* 1990, vol. 112, p. 7638.

Synthesis

The stepwise preparation, which represents the only strategy for the preparation of dendrimers at present, is a limiting factor for most applications. In contrast to dendrimers, the structurally irregular, i. e. hyperbranched polymers are obtained in a single synthetic step.

In the present invention both polymers obtained by strict hyperbranching polymerization as well as polymers obtained by subcritical polymerization of e.g. $A_2+B_3$ types of monomers are considered as hyperbranched.

A stringent criterion for strict hyperbranching polymerization is that no critical conversion $p_c$ may exist, at which gelation of the system occurs and a network structure is obtained, as disclosed by BURCHARD, W. Solution properties of branched macromolecules. *Advances in Polymer Science.* 1999, vol. 143, no. 11, p. 113-194.

Hyperbranched materials can thus be obtained by polycondensation of $AB_2$ or $AB_m$-type monomers with complementary functionality's A and B, the only coupling reaction in the system being the linking of A and B. Details on this type of polyfunctional polycondensation are disclosed by FLORY, P. J. Molecular size distribution in three-dimensional polymers. VI. Branched polymer containing A-R-Bf-1-type units. *Journal of the American Chemical Society.* 1952, vol. 74, p. 2718-2723.

U.S. Pat. No. 4,857,630 (DU PONT) and KIM, Y. H., et al. Hyperbranched polyphenylenes. *Polymer Preprints (American Chemical Society, Division of Polymer Chemistry).* 1988, vol. 29, no. 2, p. 310-311. disclose synthesis methods for preparing hyperbranched polyphenylenes.

Methods for preparing hyperbranched polymers based on polycondensation of $AB_2$-monomers are further disclosed in U.S. Pat. No. 5,196,502 (KODAK), U.S. Pat. No. 5,225,522 (KODAK) and U.S. Pat. No. 5,214,122 (KODAK).

Another suitable approach for preparing hyperbranched polymer structures is the polymerization of linear AB*-type inimers. Inimers are compounds that possess a common, linearly polymerizable moiety, such as a vinyl group or a strained cyclic component as well as an initiating group in the same molecule. Cyclic inimers have been used in the preparation of hyperbranched structures by VANDENBERG, E. J. Polymerization of glycidol and its derivatives: a new rearrangement polymerization. *Journal of Polymer Science.* 1985, vol. 23, no. 4, p. 915-949., FRECHET, J. Self-condensing vinyl polymerization: an approach to dendritic materials. *Science (Washington, D.C.).* 1995, vol. 269, no. 5227, p. 1080-1083. and EP 791021 A (CORNELL RES FOUNDATION INC).

Linear AB type compounds, commonly called "linear co-monomers" as well as poly-B-functional compounds of $B_f$-structure may be present, commonly designated "core molecules". An overview of the structural possibilities as well as a stringent definition for the degree of branching DB, a relevant parameter for the functionality of hyperbranched polymers is disclosed by HOLTER, D., et al. Degree of branching in hyperbranched polymers. *Acta Polymerica.* 1997, vol. 23, no. 48, p. 30-35., HOLTER, E. J., et al. Degree of branching (DB) in hyperbranched polymers. Part 2. Enhancement of the DB. Scope and limitations. *Acta Polymerica.* 1997, vol. 48, no. 8, p. 298-309. and FREY, H., et al. Degree of branching in hyperbranched polymers. Part 3. Copolymerization of ABm monomers with AB and ABn monomers. *Journal of Polymer Science*. 1999, vol. 50, no. 2-3, p. 67-76.

The state of the art in hyperbranched polymer research has been reviewed in:

(a) JIKEI, M. Hyperbranched polymers: a promising new class of materials. *Progress in Polymer Science*. 2001, vol. 26, no. 8, p. 1233-1285.

(b) NEWCOME, G. R., et al. Dendritic Molecules: Concepts, Synthesis, Perspectives. VCH: WEINHEIM, 2001.

(c) KIM, Y., et al. Hyperbranched polymers 10 years after. *Journal of Polymer Science, Part A. Polymer Chemistry*. 1998, vol. 36, no. 11, p. 1685-1698.

(d) VOIT, B., et al. New developments in hyperbranched polymers. *Journal of Polymer Science, Part A. Polymer Chemistry*. 2000, vol. 38, no. 14, p. 2505-2525.

(e) SUNDER, A., et al. Controlling the growth of polymer trees: concepts and perspectives for hyperbranched polymers. *Chemistry—A European Journal*. 2000, vol. 6, no. 14, p. 2499-2506.

From these reviews, it is evident that hyperbranched polymers are clearly distinguishable from the regularly branched dendrimers as well as from branched structures based on $A_2+B_3$ polymerization of two polyfunctional monomers that inevitably leads to gelation, i.e. network formation, if polymerization is not stopped at a subcritical level.

Hyperbranched polymers commonly possess broad molecular weight distribution. The polydispersity $M_w/M_n$ is usually greater than 5 and more often greater than 10. Recently new concepts have been introduced that are based on the slow addition of $AB_2$ or latent $AB_2$ monomers of suitable reactivity to a polyfunctional ($B_f$) core molecule. The procedure is disclosed by RADKE, W., et al. Effect of Core-Forming Molecules on Molecular Weight Distribution and Degree of Branching in the Synthesis of Hyperbranched Polymers. *Macromolecules*. 1998, vol. 31, no. 2, p. 239-248. and HANSELMANN, R., et al. Hyperbranched Polymers Prepared via the Core-Dilution/Slow Addition Technique: Computer Simulation of Molecular Weight Distribution and Degree of Branching. *Macromolecules*. 1998, vol. 31, no. 12, p. 3790-3801.

Hyperbranched Polymer Core

The size of the hyperbranched polymer core for a polymeric initiator according to the present invention is determined by the selected application. Most inkjet applications require inkjet inks with a low viscosity, usually lower than 100 mPa·s. Hence for inkjet applications, the hyperbranched polymers preferably have a $M_w$ smaller than 100,000, more preferably smaller than 50,000 and most preferably smaller than 20,000.

The hyperbranched polymer core for a polymeric initiator according to the present invention is preferably obtained by the method of slow monomer addition. This results in a narrow polydispersity of the hyperbranched polymers. Particularly preferred in the present invention are hyperbranched polymers with a polydispersity $M_w/M_n$ smaller than 3.

Suitable hyperbranched polymer cores are disclosed in GAO, C., et al. Hyperbranched polymers: from synthesis to applications. *Progress in Polymer Science*. 2000, vol. 29, no. 3, p. 183-275.

Other suitable hyperbranched cores are given in Table 1, without being limited thereto.

TABLE 1

PC-1

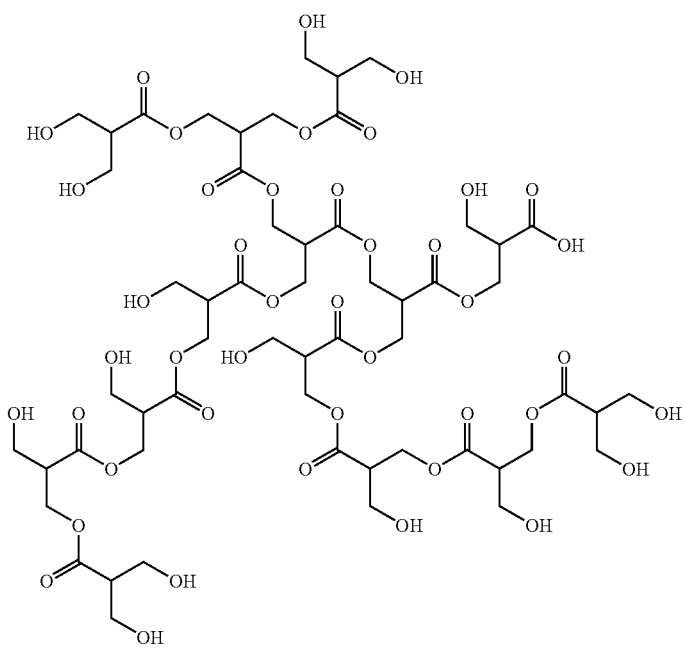

TABLE 1-continued
PC-2
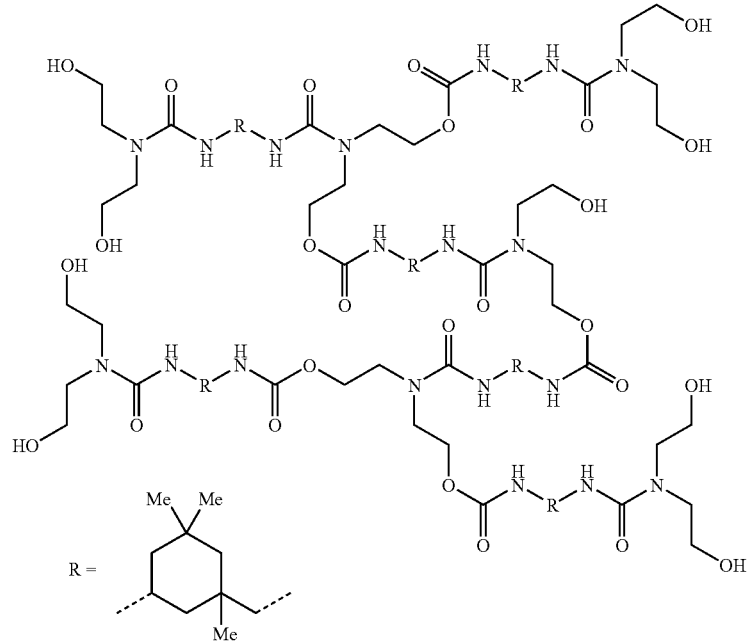
PC-3
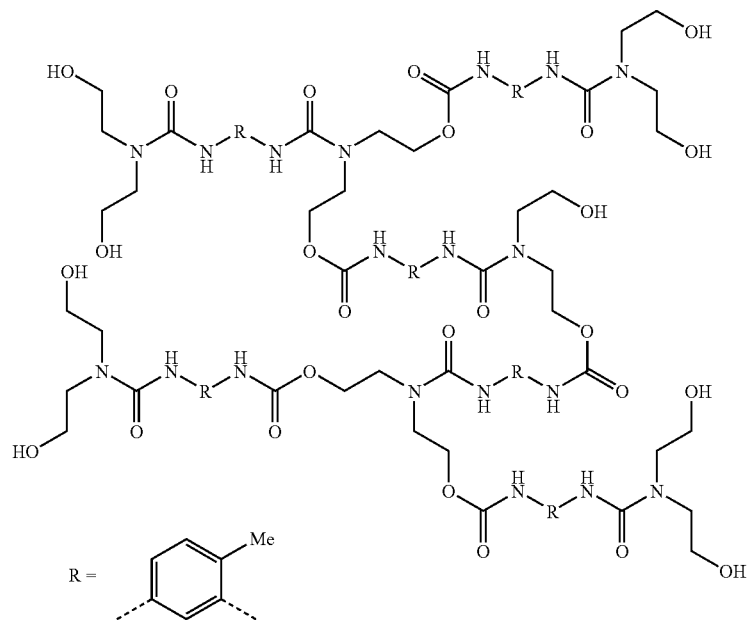

TABLE 1-continued
PC-4
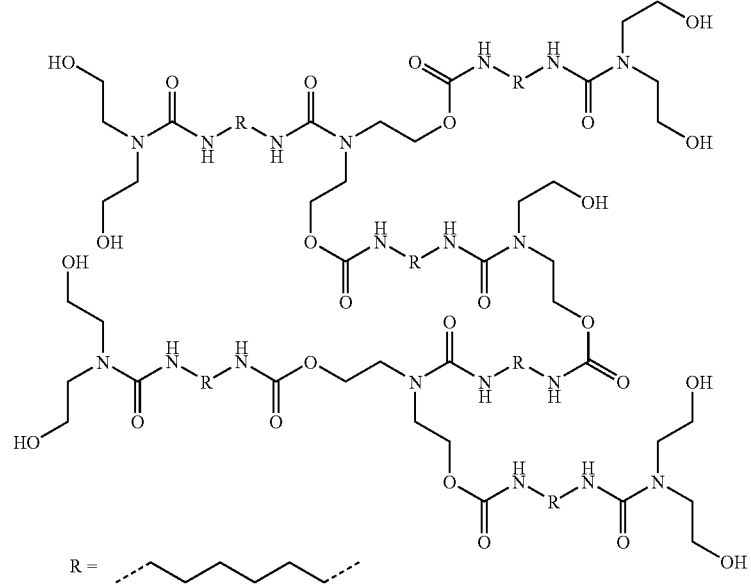
R = ⸺(CH₂)₈⸺
PC-5
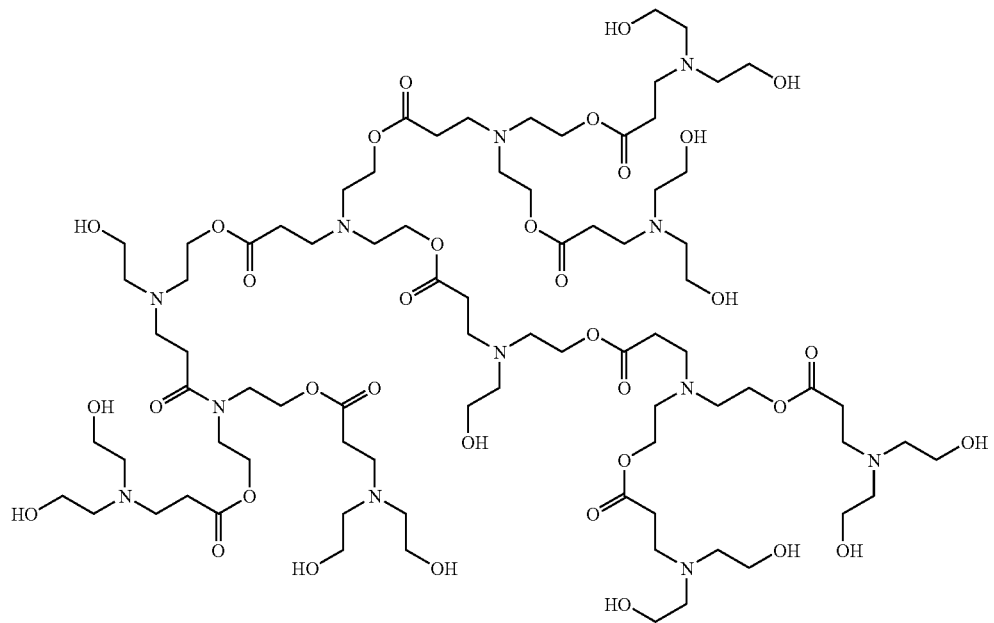

TABLE 1-continued
PC-6
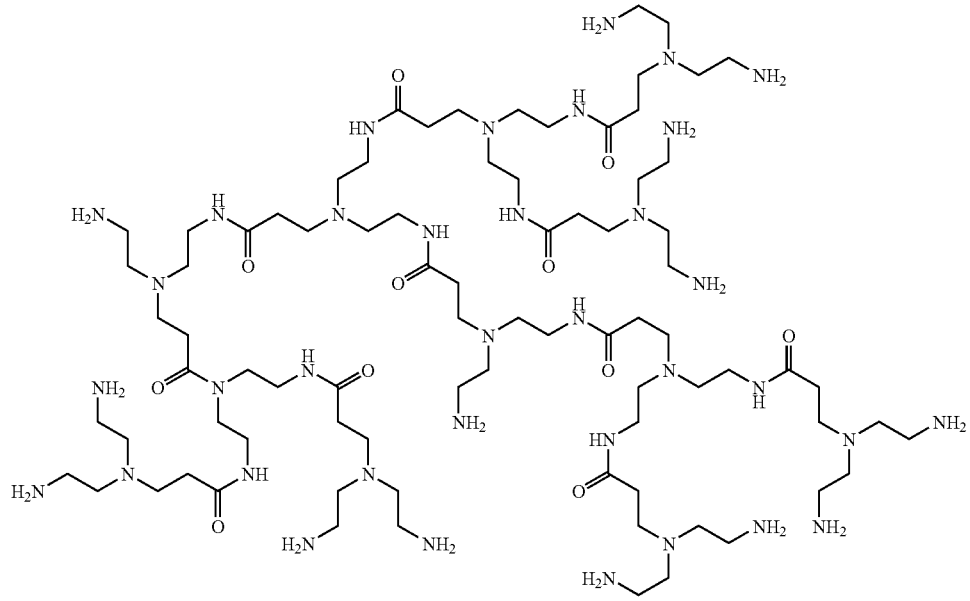
PC-7
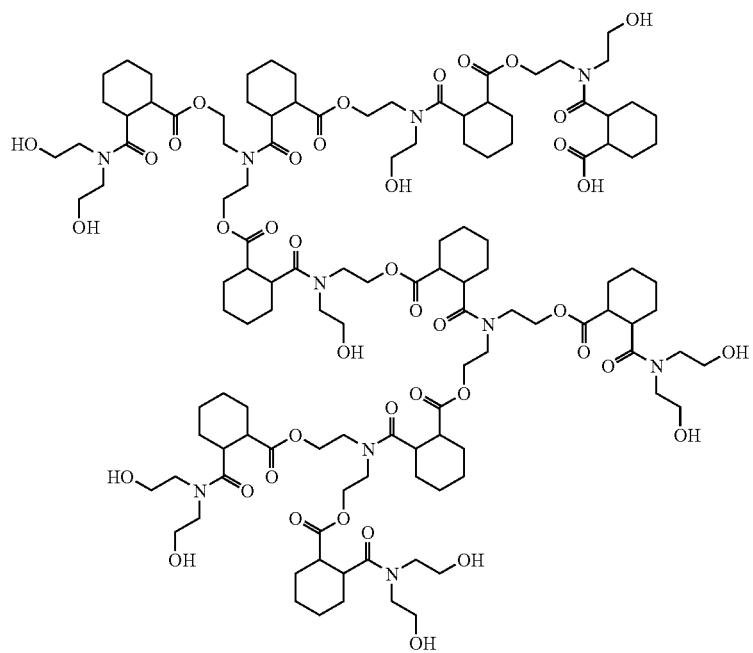

TABLE 1-continued

PC-8

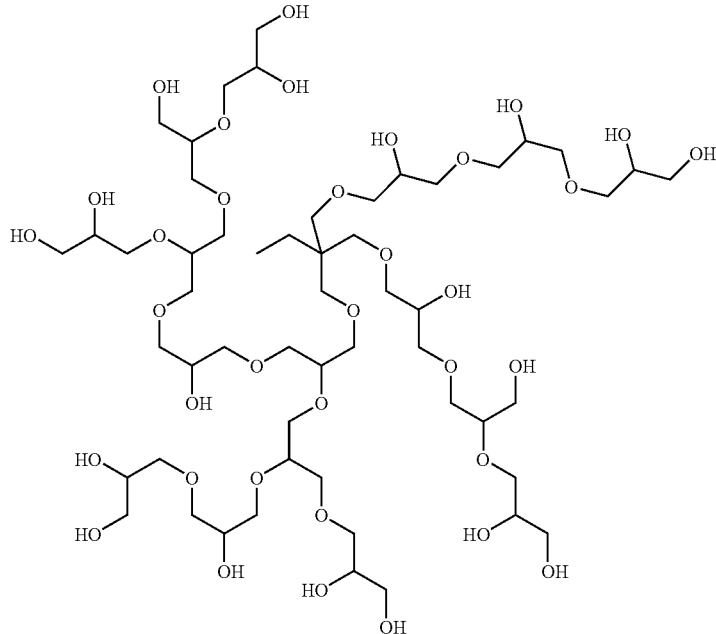

The hyperbranched polymer core can be used as a core for terminal grafting before derivatization with a reactive co-initiator (derivative). This yields a hyperbranched multiple arm graft star copolymer, which is also considered to be a hyperbranched polymer core according to the present invention. Suitable examples of this type of polymers are disclosed in SUNDER, A., et al. Hyperbranched Polyether-Polyols Based on Polyglycerol: Polarity Design by Block Copolymerization with Propylene Oxide. *Macromolecules*. 2000, vol. 33, no. 2, p. 309-314. and MAIER, S., et al. Synthesis of poly(glycerol)-block-poly(methyl acrylate) multi-arm star polymers. *Macromolecular Rapid Communications*. 2000, vol. 21, no. 5, p. 226-230.

Any hyperbranched polymer can be used as a polymer core in the polymeric co-initiators, but hyperbranched polyglycidols or hyperbranched copolymers of glycidol and other epoxides are particularly preferred. They can be readily prepared with a narrow molecular weight distribution in a single step procedure from commercially available monomers over a broad range of molecular weights. The reaction of these core polymers with at least one co-initiator or co-initiator derivative yields a particularly preferred class of hyperbranched polymeric co-initiators according to the present invention.

Branched polyols based on glycerol units are usually prepared by reacting glycidol with a hydrogen-containing compound (e.g., glycerol) in the presence of inorganic acids as disclosed by JP 61043627 A (DAICEL CHEM IND.) or organic acids as disclosed by JP 58198429 A (NIPPON YUSHI) as catalyst. The polymerization of glycidol can also be achieved via cationic polymerization using cationic initiators, such as $BF_3$ as disclosed by TOKAR, R., et al. Cationic polymerisation of glycidol: coexistence of the activated monomer and active chain end mechanism. *Macromolecules*. 1994, vol. 27, p. 320. and DWORAK, A., et al. Cationic polymerization of glycidol. Polymer structure and polymerization mechanism. *Macromolecular Chemistry and Physics*. 1995, vol. 196, no. 6, p. 1963-1970. However, a cationic polymerization method leads to hyperbranched polymer with a polydispersity larger than 3 and molecular weights can not be controlled.

A suitable procedure for the preparation of hyperbranched polyglycerols with a controlled molecular weight is disclosed in DE 19947631 A (BAYER). This is achieved by adding glycidol diluted in a hydrocarbon or an ether to a suitable polyol initiator that is dissolved in diglyme or another hydrocarbon as disclosed in SUNDER, A., et al. Controlled Synthesis of Hyperbranched Polyglycerols by Ring-Opening Multibranching Polymerization. *Macromolecules*. 1999, vol. 32, no. 13, p. 4240-4246. The monomer is added as solution containing between 20 and 99.9 wt %, e.g., 60%-90% THF. Full incorporation of an initiator is promoted by the use of a polyfunctional initiator.

Initiators

A polymeric initiator according to the present invention comprises a dendritic polymer core with at least one initiating functional group as an end group. It is essential that the initiating functional group is present as an end group on the polymer core. An initiating functional group present in the core of the polymeric structure looses it effectiveness due to steric reasons.

The polymeric initiators are obtained by reaction of at least one initiator or initiator derivative and a dendritic polymer core. The polymeric initiators have preferably at least 5 initiating functional groups as end groups on the dendritic polymer core, and most preferably at least 7 initiating functional groups as end groups.

Any initiator or initiator derivative known in the prior art can be used. These photoinitiators are usually classified into two general classes. The two main types of photoinitiators are those that form an active species by a fragmentation process and those that form an active species by a hydrogen abstraction process.

The photoinitiators that undergo Norrish Type I reactions, photolyze through a homolytic fragmentation mechanism of α-cleavage and directly form free radicals capable of initiating polymerization. The absorbed radiation causes bond cleavage to take place between a carbonyl group and an adjacent carbon.

The photoinitiators that undergo Norrish Type II reactions are activated with radiation and form free radicals by hydrogen abstraction or electron extraction from a second compound, a co-initiator or synergist, that becomes the actual initiating free radical. A disadvantage of hydrogen abstraction over homolytic fragmentation is the necessity of a bimolecular reaction.

A preferred type I-initiator or type I-initiator derivative for creating the initiating functional group on the dendritic polymer core is selected from the group consisting of benzoineth- Suitable examples of polymeric initiators according to the present invention are given below, without being limited thereto. The structures given represent one molecular weight with one degree of derivatization out of the distribution found in each prepared sample. The structures represent a more generic structure, as a specific example for different molecular weights and degrees of substitution. It is obvious for those skilled in the art that each polymer sample is a mixture of similar individual compounds, differing in both molecular weight and degree of substitution and that the chemistry can be extended over a wide range of molecular weights.

Suitable polymeric initiators according to the present invention have a hyperbranched polyether core. Example of a hyperbranched polyether core:

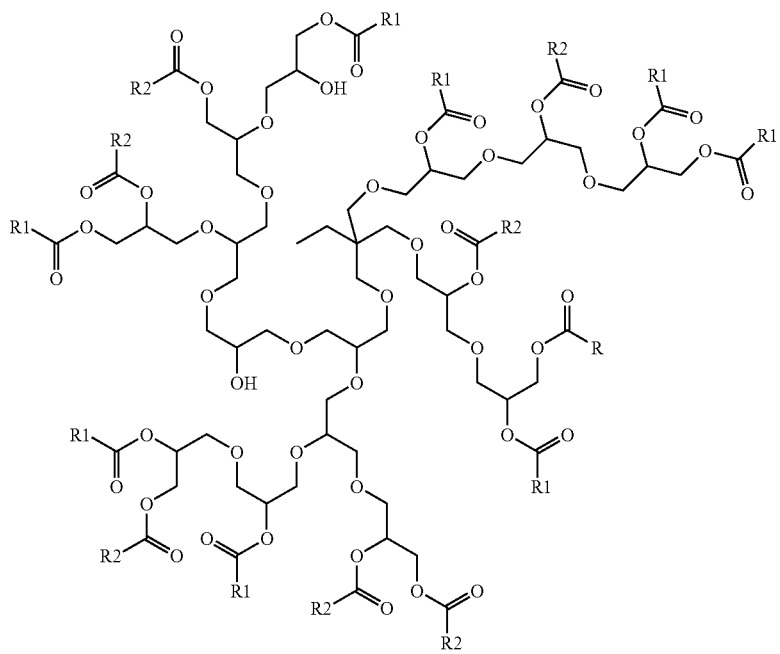

ers, benzil ketals, α,α-dialkoxyacetophenones, α-hydroxyalkylphenones, α-aminoalkylphenones, acylphosphine oxides, acylphosphine sulfides, α-haloketones, α-halosulfones and α-halophenylglyoxalates.

A preferred type II-initiator or type II-initiator derivative for creating the initiating functional group on the dendritic polymer core is selected from the group consisting of benzophenones, thioxanthones, 1,2-diketones and anthraquinones.

Suitable initiators according to the present invention, which can be attached as a initiating functional group to the polymer core, are given by CRIVELLO, J. V., et al. Photoinitiators for Free Radical Cationic and Anionic Photopolymerization. *Surface Coatings Technology*. 1998, vol. III, p. 208-224.

The dendritic polymer core can be fully or partially derivatized.

It is evident for those skilled in the art that many types of derivatization chemistry can be used in the synthesis of the polymeric initiators. In the case of hyperbranched polyglycidols, esterification and etherification is particularly preferred.

Suitable polymeric initiators according to the present invention have a hyperbranched polyether core, as displayed above, to which an initiating functional group can be attached using the compounds displayed in Table 2, without being limited thereto.

TABLE 2

| Initiator R—COOH |
|---|
| PE-1 ![benzophenone-oxyacetic acid structure] |
| PE-2 ![thioxanthone-oxyacetic acid structure] |

TABLE 2-continued

| Initiator R—COOH |
|---|
| PE-3 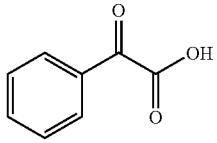 |
| PE-4 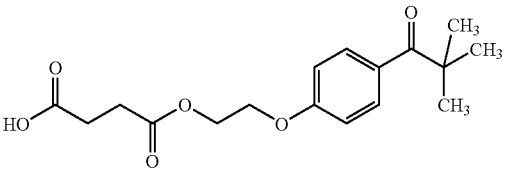 |
| PE-5 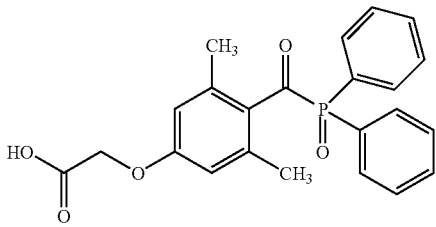 |
| PE-6 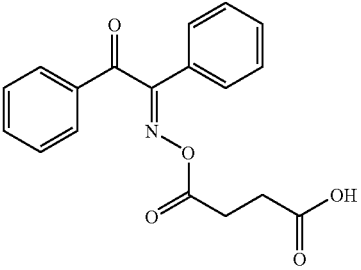 |
| PE-7 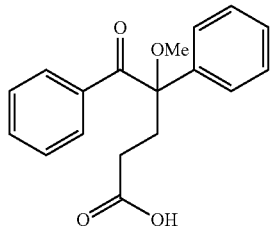 |
| PE-8 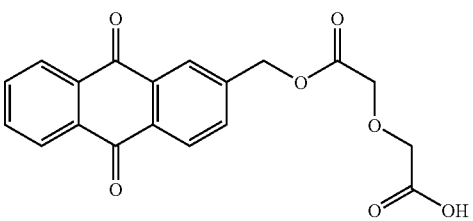 |
| PE-9 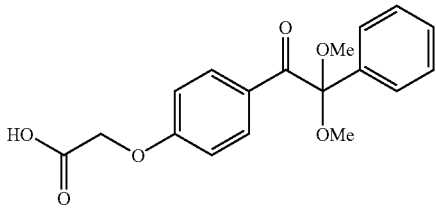 |
| PE-10 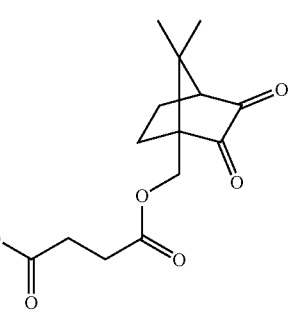 |
| PE-11 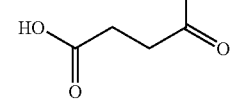 |

Suitable polymeric initiators according to the present invention have a hyperbranched polyester core. Example of a hyperbranched polyester core:

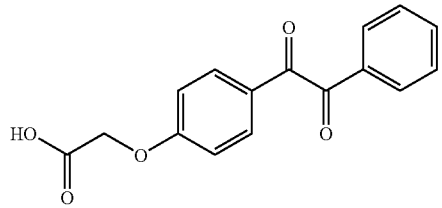

Suitable polymeric initiators according to the present invention have a hyperbranched polyester core, as displayed above, to which an initiating functional group can be attached using the compounds displayed in Table 3, without being limited thereto.

TABLE 3

| Initiator R—COOH |
|---|
| PES-1 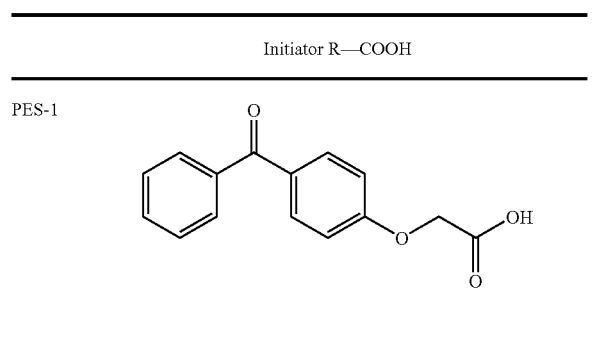 |
| PES-2 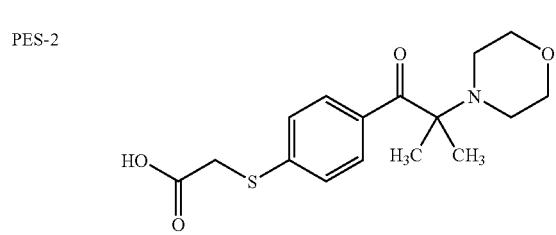 |

TABLE 3-continued

| Initiator R—COOH |
|---|
| PES-3 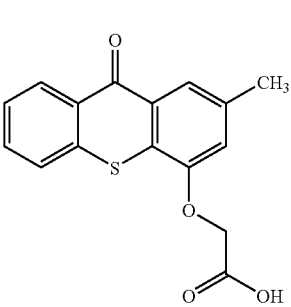 |
| PES-4 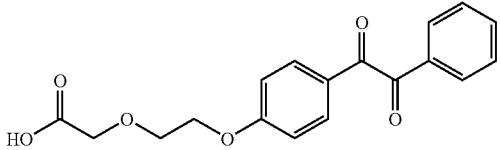 |

In a preferred embodiment, the polymeric initiators are further derivatized with a compatibilizing group. A compatibilizing group is defined as a functional group making the polymeric initiator more soluble in a specific radiation curable composition. Example of a hyperbranched polyether core with initiating functional groups:

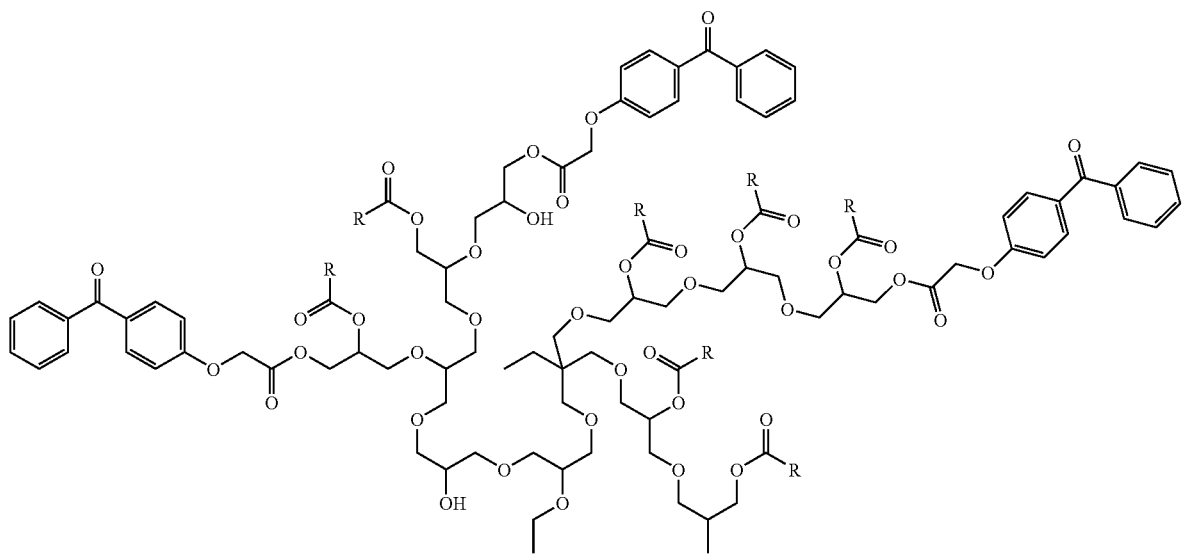

-continued

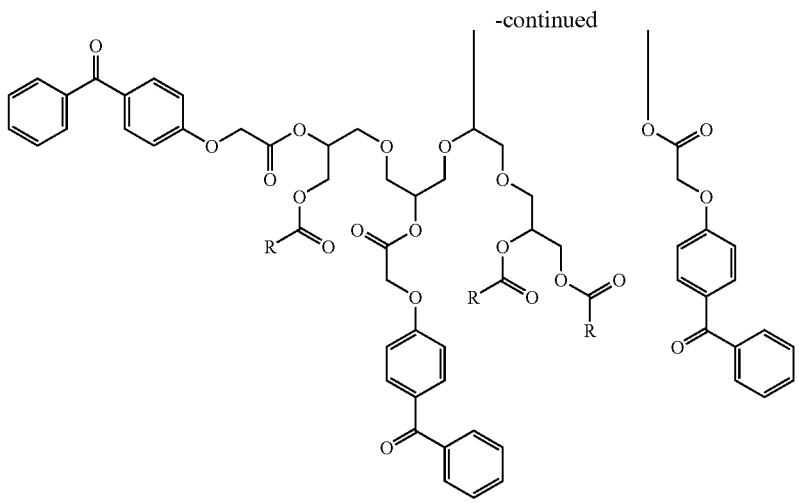

The hyperbranched polyether core, as displayed above, may be further derivatized with a compatibilizing group using the compounds displayed in Table 4, without being limited thereto.

TABLE 4

| | Compatibilizer R—COOH |
|---|---|
| C-1 | (CH₃)₃C-COOH (2,2-dimethylpropanoic acid structure) |
| C-2 | H₃C-O-CH₂CH₂-COOH |
| C-3 | H₃C-O-CH₂CH₂-O-CH₂CH₂-COOH |
| C-4 | HOOC-CH(CH₃)-O-CH₃ |
| C-5 | HOOC-CH₂CH₂-COOH |
| C-6 | 2-ethylhexanoic acid |

TABLE 4-continued

| | Compatibilizer R—COOH |
|---|---|
| C-7 | 2-carboxybenzenesulfonate sodium salt |
| C-8 | (2,4-di-tert-pentylphenoxy)acetic acid |

Radiation Curable Composition

The polymeric initiator according to the present invention can be used in any radiation curable composition such as a varnish, a lacquer and a printing ink, and especially useful in radiation curable inkjet inks.

The radiation curable inkjet ink is preferably jetted on an ink jet recording element chosen from the group consisting of paper, coated paper, polyolefin coated paper, cardboard, wood, composite boards, plastic, coated plastic, canvas, textile, metal, glasses, plant fibre products, leather, magnetic materials and ceramics.

The radiation curable inkjet ink jetted on an ink jet recording element creates an uncured printed image. This printed image is cured by radiation or electron beam exposure. A preferred means of radiation curing is ultraviolet light.

Radiation Curable Inkjet Ink

A radiation-curable inkjet ink contains at least two components: (i) a radiation-curable compound, and (ii) a polymeric initiator according to the present invention.

The radiation-curable compound can be selected from monomers and/or oligomers that can be polymerized by a curing means of an inkjet printer.

The radiation-curable inkjet ink preferably further contains at least one colorant, i.e. pigment or dye.

The radiation-curable inkjet ink may contain a polymerization inhibitor to restrain polymerization by heat or actinic radiation. It is preferred to add an inhibitor during preparation of the inkjet ink.

The radiation-curable inkjet ink may further contain at least one resin in order to obtain a stable dispersion of the colorant in the inkjet ink.

The radiation-curable inkjet ink preferably further contains at least one surfactant.

The radiation-curable inkjet ink preferably further contains at least one solvent.

The radiation-curable inkjet ink preferably further contains at least one biocide.

An inkjet printer generally uses a radiation-curable inkjet ink set consisting of a plurality of radiation-curable inkjet inks.

Radiation-Curable Compounds

The radiation curable inkjet ink contains monomers and/or oligomers, which are polymerized by the curing means of the inkjet printer. Monomers, oligomers or prepolymers may possess different degrees of functionality, and a mixture including combinations of mono-, di-, tri- and higher functionality monomers, oligomers and/or prepolymers may be used. These components are curable, typically photo-curable, e.g. UV curable, and should adhere to the ink-receiver surface after printing and serve to bind the colorant. A mixture of two or more monomers of the same functionality is preferred. With particularly preferred a mixture of two di-functional monomers.

The viscosity of the radiation curable inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is slow and expensive. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation-curable compound in the radiation curable inkjet ink, are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylates such as described in U.S. Pat. No. 6,310,115 (AGFA), 2-(vinyloxy)ethylacrylate, 2-acryloyloxyethyl-succinic acid, 2-acryloyxyethylphthalic acid, 2-acryloxy-ethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4butanediol diacrylate, 1,6hexanediol diacrylate, 1,9nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, caprolactam modified dipentaerythritol hexaacrylate, N-vinylamide such as N-vinylcaprolactam or N-vinylformamide; or acrylamide or a substituted acrylamide such as acryloylmorpholine; and amino functionalized polyetheracrylates such as described in U.S. Pat. No. 6,300,388 (AGFA).

Furthermore, methacrylates corresponding to the above-mentioned acrylates may be used with these acrylates. Of the methacrylates, methoxypolyethylene glycol methacrylate, methoxytriethylene glycol methacrylate, 4-(vinyloxy)butyl-methacrylate, vinyl ether acrylate such as described in U.S. Pat. No. 6,310,115 (AGFA), hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Polymeric Initiator

The polymeric initiator according to the present invention is usually called a photo-initiator in radiation curable inkjet inks and is present for initiating the polymerization reaction. The photo-initiator requires less energy to activate than the monomers and oligomers to form the polymer.

The photo-initiator absorbs light and is responsible for the production of free radicals or cations. Free radicals or cations are high-energy species that induce polymerization of monomers, oligomers and polymers and with polyfunctional monomers and oligomers thereby also inducing cross-linking.

A preferred amount of polymeric initiator is 1-50 wt % of the total ink weight, and more preferably 1 to 25 wt % of the total ink weight.

Colorants

Colorants may be dyes, but are preferably pigments or a combination thereof. Organic and/or inorganic pigments may be used.

The pigment particles should be sufficiently small to permit free flow of the ink through the inkjet printing device, especially at the ejecting nozzles which usually have a diameter ranging from 10 µm to 50 µm. The particle size influences also the pigment dispersion stability. It is also desirable to use small particles for maximum colour strength. The particles of the pigment dispersed in the inkjet ink should have a particle size of less than 10 μm, preferably less than 3 μm, and most preferably less than 1 μm. The average particle size of pigment particles is preferably 0.05 to 0.5 μm.

Suitable pigments include as red or magenta pigments: Pigment Red 3, 5, 19, 22, 31, 38, 43, 48: 1, 48: 2, 48: 3, 48: 4, 48: 5, 49: 1, 53: 1, 57: 1, 57: 2, 58: 4, 63: 1, 81, 81: 1, 81: 2, 81: 3, 81: 4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88; as blue or cyan pigments: Pigment Blue 1, 15, 15: 1, 15: 2, 15: 3, 15: 4, 15: 6, 16, 17-1, 22, 27, 28, 29, 36, and 60; as green pigments: Pigment green 7, 26, 36, and 50; as yellow pigments: Pigment Yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185, and 193; as white pigment: Pigment White 6, 18, and 21.

Furthermore, the pigment may be chosen from those disclosed by HERBST, W. et al. Industrial Organic Pigments, Production, Properties, Applications. 2nd edition. VCH, 1997.

Most preferred pigments are Pigment Yellow 1, 3, 128, 109, 93, 17, 14, 10, 12, 13, 83, 65, 75, 74, 73, 138, 139, 154, 151, 180, 185; Pigment Red 122, 22, 23, 17, 210, 170, 188, 185, 146, 144, 176, 57:1, 184, 202, 206, 207; Pigment Blue 15:3, Pigment Blue 15:2, Pigment Blue 15:1, Pigment Blue 15:4, Pigment Blue 15:6, Pigment Blue 16 and Pigment Violet 19.

Carbon black is usually used as the colouring material in black ink. Suitable black pigment materials include carbon blacks such as Pigment Black 7 (e.g. Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. Additional examples of suitable pigments are disclosed in U.S. Pat. No. 5,538,548 (BROTHER).

The pigment is present in the range of 0.1 to 10 wt %, preferably in the range 1 to 5 wt % based on the total weight of the radiation curable inkjet ink.

Dyes suitable for the radiation curable inkjet ink include direct dyes, acidic dyes, basic dyes and reactive dyes.

Suitable direct dyes for a radiation curable inkjet ink include:
  C.I. Direct Yellow 1, 4, 8, 11, 12, 24, 26, 27, 28, 33, 39, 44, 50, 58, 85, 86, 100, 110, 120, 132, 142, and 144
  C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343
  C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237
  C.I. Direct Black 2, 3, 7, 17, 19, 22, 32, 38, 51, 56, 62, 71, 74, 75, 77, 105, 108, 112, 117, and 154

Suitable acidic dyes for the radiation curable inkjet ink include:
  C.I. Acid Yellow 2, 3, 7, 17, 19, 23, 25, 20, 38, 42, 49, 59, 61, 72, and 99
  C.I. Acid Orange 56 and 64
  C.I. Acid Red 1, 8, 14, 18, 26, 32, 37, 42, 52, 57, 72, 74, 80, 87, 115, 119, 131, 133, 134, 143, 154, 186, 249, 254, and 256
  C.I. Acid Violet 11, 34, and 75
  C.I. Acid Blue 1, 7, 9, 29, 87, 126, 138, 171, 175, 183, 234, 236, and
  C.I. Acid Green 9, 12, 19, 27, and 41
  C.I. Acid Black 1, 2, 7, 24, 26, 48, 52, 58, 60, 94, 107, 109, 110, 119, 131, and 155

Suitable reactive dyes for the radiation curable inkjet ink include:
  C.I. Reactive Yellow 1, 2, 3, 14, 15, 17, 37, 42, 76, 95, 168, and 175
  C.I. Reactive Red 2, 6, 11, 21, 22, 23, 24, 33, 45, 111, 112, 114, 180, 218, 226, 228, and 235
  C.I. Reactive Blue 7, 14, 15, 18, 19, 21, 25, 38, 49, 72, 77, 176, 203, 220, 230, and 235
  C.I. Reactive Orange 5, 12, 13, 35, and 95
  C.I. Reactive Brown 7, 11, 33, 37, and 46
  C.I. Reactive Green 8 and 19
  C.I. Reactive Violet 2, 4, 6, 8, 21, 22, and 25
  C.I. Reactive Black 5, 8, 31, and 39

Suitable basic dyes for the radiation curable inkjet ink include:
  C.I. Basic Yellow 11, 14, 21, and 32
  C.I. Basic Red 1, 2, 9, 12, and 13
  C.I. Basic Violet 3, 7, and 14
  C.I. Basic Blue 3, 9, 24, and 25

Dyes can only manifest the ideal colour in an appropriate range of pH value. Therefore, the radiation curable inkjet ink preferably further comprises a pH buffer, such as potassium hydroxide (KOH).

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer® GA-80, Sumilizer® GM and Sumilizer® GS produced by Sumitomo Chemical Co., Ltd.

Since excessive addition of these polymerization inhibitors will lower the ink sensitivity to curing, it is preferred that the amount capable of preventing polymerization be determined prior to blending. The amount of a polymerization inhibitor is generally between 200 and 20,000 ppm of the total ink weight.

Resins

The radiation curable inkjet ink may further contain a resin, also called a pigment stabilizer or dispersant, in order to obtain a stable dispersion of the pigment(s) in the inkjet ink.

The pigments may be added to the radiation curable inkjet ink as a dispersion comprising a dispersant.

Suitable resins: petroleum type resins (e.g., styrene type, acryl type, polyester, polyurethane type, phenol type, butyral type, cellulose type, and rosin); and thermoplastic resins (e.g., vinyl chloride, vinylacetate type). Concrete examples of these resins include acrylate copolymers, styrene-acrylate copolymers, acetalized and incompletely saponified polyvinyl alcohol, and vinylacetate copolymers. Commercial resins are known under the tradenames Solsperse® 32000 and Solsperse® 39000 available from AVECIA, EFKA® 4046 available from EFKA CHEMICALS BV, Disperbyk® 168 available from BYK CHEMIE GmbH.

A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

Typically resins are incorporated at 2.5% to 200%, more preferably at 50% to 150% by weight of the pigment.

Surfactants

The radiation curable inkjet ink may contain at least one surfactant. The surfactant(s) can be anionic, cationic, non-ionic, or zwitter-ionic and are usually added in a total quantity below 20 wt % based on the total ink weight and particularly in a total below 10 wt % based on the total ink weight.

A fluorinated or silicone compound may be used as a surfactant, however, a potential drawback is extraction by food from inkjet food packaging material because the surfactant does not cross-link. It is therefore preferred to use a copolymerizable monomer having surface-active effects, for example, silicone-modified acrylates, silicone modified methacrylates, fluorinated acrylates, and fluorinated methacrylates.

Solvents

The radiation curable inkjet ink may contain as a solvent, water and/or organic solvents, such as alcohols, fluorinated solvents and dipolar aprotic solvents, the solvent preferably being present in a concentration between 10 and 80 wt %, particularly preferably between 20 and 50 wt %, each based on the total weight of the radiation curable inkjet ink.

However, the radiation curable inkjet ink preferably does not contain an evaporable component, but sometimes, it can be advantageous to incorporate an extremely small amount of an organic solvent in such inks to improve adhesion to the ink-receiver surface after UV curing. In this case, the added solvent can be any amount in the range which does not cause problems of solvent resistance and VOC, and preferably 0.1-5.0 wt %, and particularly preferably 0.1-3.0 wt %, each based on the total weight of the radiation curable inkjet ink Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N, N-dimethylformamid may be used.

Biocides

Suitable biocides for the radiation curable inkjet ink include sodium dehydroacetate, 2-phenoxyethanol, sodium benzoate, sodium pyridinethion-1-oxide, ethyl p-hydroxybenzoate and 1,2-benzisothiazolin-3-one and salts thereof. A preferred biocide for radiation curable inkjet ink is Proxel® GXL available from ZENECA COLOURS.

A biocide is preferably added in an amount of 0.001 to 3 wt %, more preferably 0.01 to 1.00 wt. %, each based on the radiation curable inkjet ink.

Preparation of a Radiation Curable Inkjet Ink

A dispersion of colorant for use in the radiation curable inkjet ink may be prepared by mixing, milling and dispersion of colorant and resin. Mixing apparatuses may include a pressure kneader, an open kneader, a planetary mixer, a dissolver, and a Dalton Universal Mixer. Suitable milling and dispersion apparatuses are a colloid mill, a high-speed disperser, double rollers, a bead mill, a paint conditioner, and triple rollers. The dispersions may also be prepared using ultrasonic energy.

In the process of mixing, milling and dispersion, each process is performed with cooling to prevent build up of heat, and as much as possible under light conditions in which UV-light has been substantially excluded.

The radiation curable inkjet ink may be prepared using separate dispersions for each colorant, or alternatively several pigments may be mixed and co-milled in preparing the dispersion.

EXAMPLES

The present invention will now be described in detail by way of Examples hereinafter.

Measurement Methods

Curing Speed

The percentage of the maximum output of the lamp was taken as a measure for curing speed, the lower the number the higher curing speed. A sample was considered as fully cured at the moment scratching with a Q-tip caused no visual damage.

Method of Extraction

A sample of 3 cm in diameter was taken from each coated and cured curable composition. The sample was put in a beaker and extracted twice with 2 mL acetonitrile using ultrasound. The beaker and the sample were rinsed with 5 mL acetonitrile and the acetonitrile fractions were pooled and filtered over a Millex 0.2 µm filter. 10 mg of the reference compounds (the hyperbranched polymers or comparative compounds) were dissolved in 50 mL acetonitrile.

The samples were analyzed on a Alltime C18 5 µm HPLC column (Alltech) (150 mm×3.2 mm)

20 µL of the extraction samples and 5 µL of the reference compounds were injected. An isocratic elution was performed using 10/90 mixture of $H_2O/CH_3CN$ as an eluent. The total peak area compared to the reference compounds was taken as a measure for the amount initiator extracted. This was calculated back to a percentage of the original amount of initiator in the curable composition.

Viscosity

The viscosity of the radiation curable composition was measured with a Brookfield DV-II+ viscometer at 25° C. and shear rate 3 RPM.

Materials

All materials used in the following examples were readily available from Aldrich Chemical Co. (Belgium) unless otherwise specified. The "water" used in the examples was deionized water. The following materials were used:

DPGDA® is a difunctional acrylate monomer available from UCB.

Sartomer® SR351 is a trifunctional acrylate monomer available from BASF.

Craynor® CN386 is a commercial co-initiator supplied by Cray Valley.

Irgacure® 2959 is a photo-initiator mixture available from CIBA SPECIALTY CHEMICALS.

Darocur® 1173 is a photo-initiator available from CIBA SPECIALTY CHEMICALS.

NMDA is N-methyldiethanolamine, a synergist available from ALDRICH.

All hyperbranched polyglycidols $PG_8$, $PG_{15}$, $PG_{17}$, $PG_{33}$ and $PG_{36}$ are available from HYPERPOLYMERS GmbH, Freiburg, Germany PET is poly(ethylene) terephthalate. Unsubbed PET substrate with on the backside an anti-blocking layer with anti-static properties available from AGFA-GEVAERT as P125C PLAIN/ABAS.

Example 1

This example illustrates the synthesis of a polymeric initiator with a hyperbranched polyglycidol core and benzophenone used for the initiating functional groups and acetyl groups as compatibilizing groups. The polymeric initiators PI-1 to PI-2 are represented by generalized formula PI-A.

Generalized formula PI-A
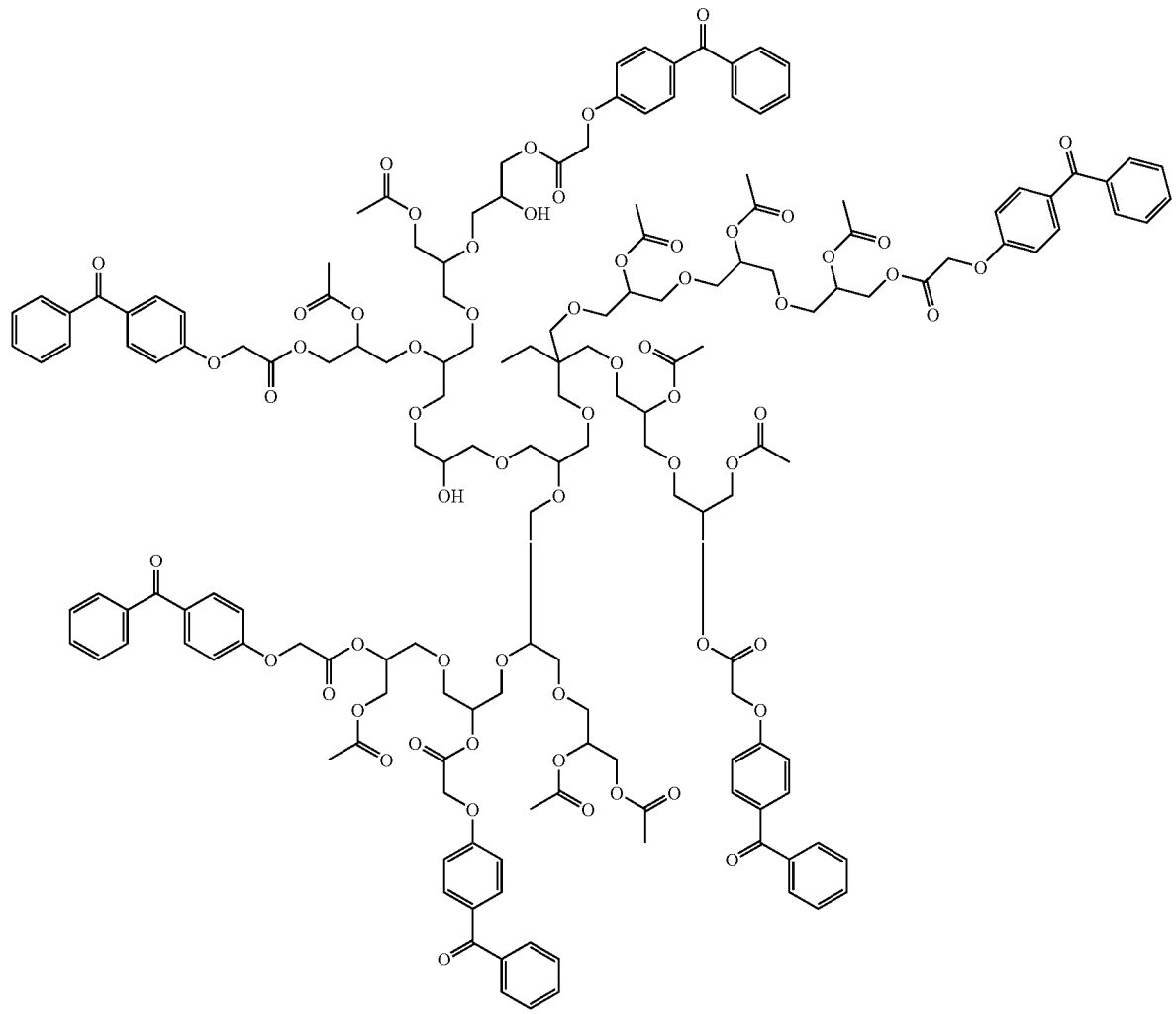
The synthesis is performed according to the following scheme:
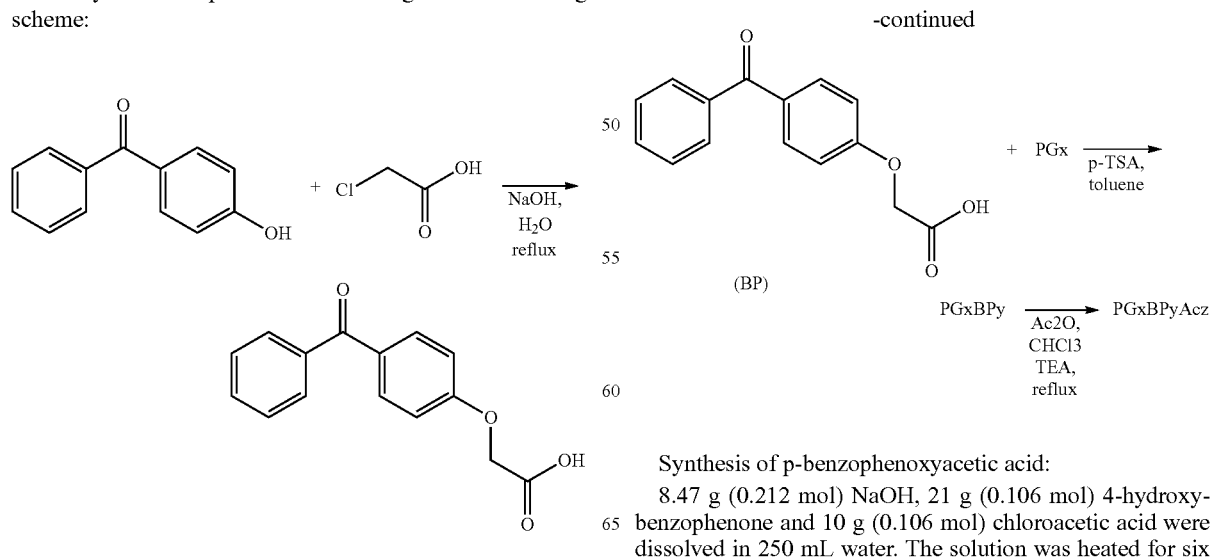
Synthesis of p-benzophenoxyacetic acid:
8.47 g (0.212 mol) NaOH, 21 g (0.106 mol) 4-hydroxybenzophenone and 10 g (0.106 mol) chloroacetic acid were dissolved in 250 mL water. The solution was heated for six hours at 100° C. After cooling down to room temperature, the solution was acidified with concentrated HCl. Acetone was used to dissolve the precipitated benzophenone. The residual salts were removed by filtration and the solvent was evaporated under reduced pressure. Chloroform was added and the mixture was refluxed for 2 h. After cooling down, the benzophenone derivative precipitated from the medium and was isolated by filtration. Yield was 50.6%.

The hyperbranched polyglycidol $PG_8$, selected for this example, was a hyperbranched polyglycidol with 8 hydroxyl groups on average.

Polymeric Initiator PI-1 ($PG_8BP_{5.8}Ac_{2.2}$)

2 g of polyglycidol $PG_8$, p-benzophenoxyacetic acid (0.4 eq relative to the amount of OH of PG) and p-toluenesulfonic acid (0.1 eq relative to the amount of OH of PG) were added into a 100 mL flask with a magnetic stirrer and equipped with a Dean-Stark. 40 mL toluene was added. The mixture was heated to 136° C. for 1 hour. After removal of the volatile components under reduced pressure, the residue was dissolved in chloroform. Then acetic anhydride (2 eq relative to the amount of OH of PG) and triethylamine (2 eq relative to the amount of OH of PG) were added. The mixture was refluxed for 6 h. After cooling down, water was added and the mixture was stirred at room temperature for one hour. Then the mixture was washed twice with 2N HCl, twice with deionized water, twice with 10% NaOH aq and then three times with deionized water. The organic phase was dried over anhydrous $Na_2SO_4$. The solvent was removed under reduced pressure and the residue was dried overnight under reduced pressure at 40° C.

The obtained polymeric initiator PI-1 was a hyperbranched polyglycidol with 8 hydroxyl end groups on average, where 5.8 on average were acylated with p-benzophenoxyacetic acid and 2.2 on average were acylated with acetyl chloride. The polymeric initiator PI-1 had a numeric average molecular weight of 2000.

Polymeric Initiator PI-2 ($PG_{15}BP_{4.8}Ac_{10.2}$)

The polymeric initiator PI-2 was prepared in the same manner as polymeric initiator PI-1 except that the hyperbranched polyglycidol $PG_{15}$, a hyperbranched polyglycidol with 15 hydroxyl groups on average, was used instead of the hyperbranched polyglycidol $PG_8$.

The obtained polymeric initiator PI-1 was a hyperbranched polyglycidol with 15 hydroxyl end groups on average, where 4.8 on average were acylated with p-benzophenoxyacetic acid and 10.2 on average were acylated with acetyl chloride. The polymeric initiator PI-1 had a numeric average molecular weight of 2600.

Example 2

This example illustrates the effectiveness in radiation curable compositions of the polymeric initiators synthesized in Example 1.

The comparative radiation curable compositions COMP-1 and COMP-2 and the inventive radiation curable compositions INV-1 to INV-3 were prepared according to Table 5. The weight % (wt %) was based on the total weight of the radiation curable composition.

TABLE 5

| wt % of | COMP-1 | COMP-2 | INV-1 | INV-2 | INV-3 |
|---|---|---|---|---|---|
| DPGDA ® | 57.5 | 57.5 | 55.5 | 55.5 | 50.0 |
| Sartomer ® SR351 | 30.0 | 30.0 | 30.0 | 30.0 | 30.0 |
| Darocur ® 1173 | — | 5.0 | — | 5.0 | — |
| NMDA | 5.0 | 5.0 | 5.0 | 5.0 | 5.0 |

TABLE 5-continued

| wt % of | COMP-1 | COMP-2 | INV-1 | INV-2 | INV-3 |
|---|---|---|---|---|---|
| COIN-1 | 7.5 | 7.5 | — | — | — |
| P1-1 (PG8BP5.8Ac2.2) | — | — | 9.5 | 9.5 | — |
| P1-2 (PG15BP4.8Ac10.2) | — | — | — | — | 15 |

The comparative initiator COIN-1 in this example is the methyl ester of p-benzophenoxyacetic acid.

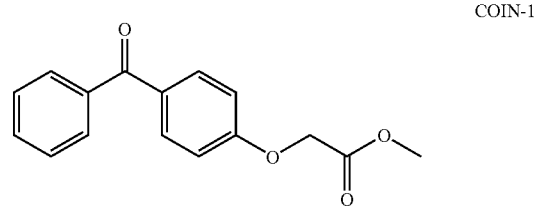

COIN-1

The comparative radiation curable compositions COMP-1 and COMP-2 and the inventive radiation curable compositions INV-1 to INV-3 were coated on an unsubbed 100 μm PET substrate using a bar coater and a 10 μm wired bar. Each coated layer was cured using a Fusion DRSE-120 conveyer, equipped with a Fusion VPS/I600 lamp (D-bulb), which transported the samples under the UV lamp on a conveyer belt at a speed of 20 m/min. The curing speed was determined for the comparative radiation curable compositions COMP-1 and COMP-2 and the inventive radiation curable compositions INV-1 to INV-3. The results are summarized in Table 6.

TABLE 6

| Radiation curable Composition | Sensitivity % of maximum output |
|---|---|
| COMP-1 | 55 |
| COMP-2 | 45 |
| INV-1 | 60 |
| INV-2 | 55 |
| INV-3 | 70 |

Table 6 shows that all inventive radiation curable compositions have a comparable curing speed compared to the comparative radiation curable compositions the state of the art commercial initiator COIN-1.

Example 3

This example illustrates that the polymeric initiators according to the present invention are not likely to be extracted by food when food packaging materials are printed upon with a radiation curable ink containing such a polymeric initiator.

Radiation curable compositions were prepared according to Table 7 using the polymeric initiators synthesized in Example 1. The weight % (wt %) was based on the total weight of the radiation curable composition.

TABLE 7

| wt % of | COMP-3 | INV-4 | INV-5 |
|---|---|---|---|
| DPGDA ® | 52.5 | 50.5 | 45.0 |
| Sartomer ® SR351 | 30.0 | 30.0 | 30.0 |

TABLE 7-continued

| wt % of | COMP-3 | INV-4 | INV-5 |
|---|---|---|---|
| Craynor ® CN386 | 10.0 | 10.0 | 10.0 |
| COIN-1 | 7.5 | — | — |
| PI-1 (PG8BP5.8Ac2.2) | — | 9.5 | — |
| PI-2 (PG15BP4.8Ac10.2) | — | — | 15.0 |

The comparative radiation curable composition COMP-3 and the inventive radiation curable compositions INV-4 and INV-5 were coated on an unsubbed 100 μm PET substrate using a bar coater and a 10 μm wired bar. Each coated layer was cured using a Fusion DRSE-120 conveyer, equipped with a Fusion VPS/I600 lamp (D-bulb), which transported the samples under the UV lamp on a conveyer belt at a speed of 20 m/min. The amount of initiator was determined that could be extracted from coated and cured samples of the comparative radiation curable composition COMP-3 and the inventive radiation curable compositions INV-4 and INV-5. The results are summarized in Table 8.

TABLE 8

| Coated & cured sample of composition | % initiator extracted |
|---|---|
| COMP-2 | 100% |
| INV-4 | 36% |
| INV-5 | 28% |

The results in Table 8 clearly demonstrate the reduced extractability of the polymeric initiators according to this invention from the coated and cured samples of the inventive radiation curable compositions INV-4 and INV-5.

Example 4

This example illustrates that hyperbranched polymeric initiators can be further derivatized with a compatibilizing group and that they remain effective polymeric initiators in radiation curable compositions.

Hyperbranched polyglycidols were derivatized with benzophenone as photoinitiator and 2-[2-(2-methoxyethoxy)ethoxy]acetic acid as compatibilizer. The prepared polymeric initiators PI-3 to PI-4 are represented by generalized formula PI-B.

wherein,
PG represents a hyperbranched polyglycidol core
x represents the average number of terminal hydroxyl groups in the starting polyglycidol The polymeric initiators PI-3 and PI-4 were prepared according to Table 9, which mentions the ratio of the different groups acylated onto each starting polyglycidol core.

TABLE 9

| Polymeric initiator | x | BP | MEEA | Ac | General formula |
|---|---|---|---|---|---|
| PI-3 | 17 | 9.6 | 7.4 | — | $PG_{17}DB_{9.6}MEEA_{7.4}$ |
| PI-4 | 17 | 5.2 | 11.3 | 0.5 | $PG_{17}DB_{5.2}MEEA_{11.3}Ac_{0.5}$ |

The synthesis is exemplified for the polymeric initiator PI-3.

2 g (1.65 mmol) of $PG_{17}$, 3.59 g (14.0 mmol) of p-benzophenoxyacetic acid and 0.53 g (2.80 mmol) of p-toluenesulfonic acid monohydrate were added into a 100 mL one-neck flask equipped with Dean-Stark and condenser. Then around 40 mL of toluene was added. The mixture was heated to 136° C. and stirred for one hour. Then 2.59 mL (16.8 mmol) of MEEA was introduced. The mixture was stirred under the same condition for additional 6 hours. After removing the solvent under reduced pressure, the residue was dissolved in chloroform. Then the mixture was extracted twice with a 2N aqueous HCl solution, twice with deionized water, twice with 10% NaOH aq and then three times with deionized water. The organic phase was dried over anhydrous $Na_2SO_4$. After removing the solvent under reduced pressure, the residue was kept at 40° C. in vacuum oven overnight.

$^1$H NMR ($CDCl_3$): δ=0.77, 1.32 (TMP core of PG); 2.98-5.42 (protons of PG and MEEA moieties, —$OCH_2COO$—); 6.62-8.05 (protons of aromatic ring of BP moieties).

The synthesis of the polymeric initiators had the properties disclosed by Table 10.

TABLE 10

| Polymeric initiator | $M_n$ | Yield |
|---|---|---|
| PI-3 | 4687 | 41% |
| PI-4 | 4285 | 55% |

The comparative radiation curable compositions COMP-4 and COMP-5 and the inventive radiation curable composi- Generalized formula PI-B

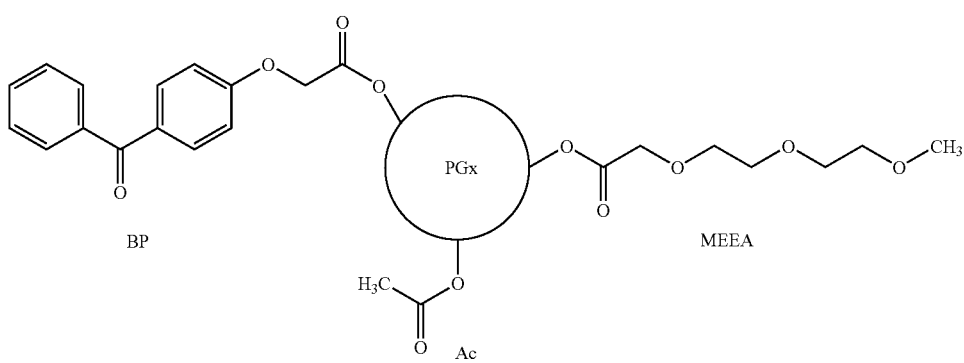

tions INV-6 and INV-7 were prepared according to Table 11. The weight % (wt %) was based on the total weight of the radiation curable composition.

TABLE 11

| wt % of | COMP-4 | COMP-5 | INV-6 | INV-7 |
|---|---|---|---|---|
| DPGDA ® | 42.5 | 37.5 | 36.5 | 27 |
| Sartomer ® SR351 | 40.0 | 40.0 | 40.0 | 40.0 |
| Craynor ® CN386 | 10.0 | 10.0 | 10.0 | 10.0 |
| COIN-1 | 7.5 | — | — | — |
| COIN-2 | — | 12.5 | — | — |
| PI-3 | — | — | 13.5 | — |
| PI-4 | — | — | — | 23 |

The molar ratio between the benzophenone moieties and Craynor® CN386 was kept constant for all radiation curable compositions. The comparative initiator COIN-1 is the methyl ester of p-benzophenoxyacetic acid also used in Example 2. The comparative initiator COIN-2 is disclosed in U.S. Pat. No. 5,538,548 (BROTHER). The average Mw of the starting pentaerythritol ethoxylate was 576.

able compositions INV-6 and INV-7. The results are summarized in Table 12.

TABLE 12

| Radiation curable Composition | Viscosity (mPa · s) | Sensitivity % of maximum output |
|---|---|---|
| COMP-4 | 20 | 55 |
| COMP-5 | 25 | 40 |
| INV-6 | 29 | 45 |
| INV-7 | 28 | 45 |

Table 12 shows that the inventive radiation curable compositions INV-6 and INV-7 have a good curing speed compared to the comparative radiation curable compositions COMP-4 and COMP-5. Although the Mw of the polymeric initiators was much higher, the viscosity of the inventive radiation curable compositions INV-6 and INV-7 was com-

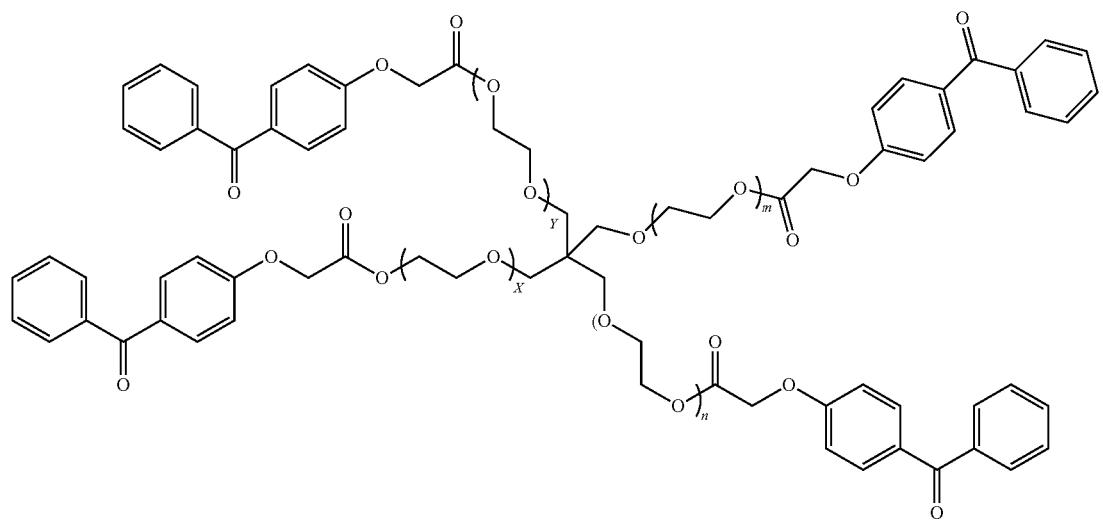

Comparative initiator COIN-2

The comparative radiation curable compositions COMP-4 and COMP-5 and the inventive radiation curable compositions INV-6 and INV-7 were coated on an unsubbed 100 μm PET substrate using a bar coater and a 10 μm wired bar. Each coated layer was cured using a Fusion DRSE-120 conveyer, equipped with a Fusion VPS/I600 lamp (D-bulb), which transported the samples under the UV lamp on a conveyer belt at a speed of 20 m/min. The curing speed and viscosity was determined of the comparative radiation curable compositions COMP-4 and COMP-5 and the inventive radiation curparable to that of the comparative radiation curable compositions COMP-4 and COMP-5

Example 5

In this example the synthesis of hyperbranched polyglycidols derivatized with thioxanthones as photoinitiator and 2-[2-(2-methoxyethoxy)ethoxy] acetic acid as compatibilizer is described. The polymeric initiator is represented by generalized formula PI-5.

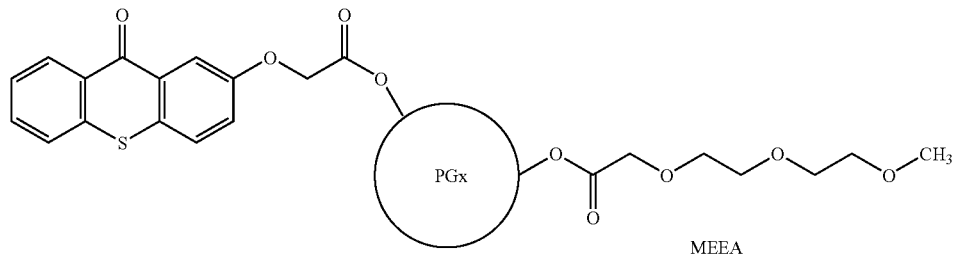

Generalized formula PI-5 wherein,

PG represents a hyperbranched polyglycidol core x represents the average number of terminal hydroxyl groups in the starting polyglycidol.

The synthesis is exemplified for the polymeric initiator $PG_{17}TA_{10}MEEA_7$. 1.50 g (1.24 mmol) of $PG_{17}$, 1.80 g (6.32 mmol) of 2-thioxanthonoxyacetic acid (TA), prepared according to AYDIN, M., et al. One-component bimolecular photoinitiating systems, 2 thioxanthone acetic acid derivatives as photoinitiators for free radical polymerization. *Macromolecular Rapid Communications*. 2003, vol. 24, no. 12, p. 718-723, 0.97 mL (6.32 mmol) of MEEA and 0.41 g (2.11 mmol) of p-toluenesulfonic acid monohydrate were added into a 100 mL one-neck flask equipped with Dean-Stark and condenser. Then 40 mL of toluene was added. The mixture was heated to 136° C. and stirred for 3 hours, while water was removed azeotropically. Then 1.94 mL (12.6 mmol) of MEEA was introduced. The mixture was stirred under the same condition for additional 6 hours. After removing the solvent under reduced pressure, the residue was dissolved in chloroform. The mixture was washed twice with 10% of NaOH aq and several times with NaCl aq until pH=7. The organic phase was dried over anhydrous $Na_2SO_4$. The solvent was removed under reduced pressure and the residue was dried over night at 40° C. under vacuum.

The synthesized $PG_{17}TA_{5.7}MEEA_{11}$ had a $M_n$ of 4505 and a yield of 51%. $^1$H NMR ($CDCl_3$): δ=0.77, 1.32 (TMP core of PG); 2.84-5.43 (protons of PG and MEEA moieties, —$OCH_2COO$—); 7.10-8.64 (protons of aromatic ring).

Example 6

The synthesis of hyperbranched polyglycidols derivatized with benzoylformic acid as photoinitiator and 2-[2-(2-methoxyethoxy)ethoxy] acetic acid as compatibilizer is described in this example. The polymeric initiators are represented by generalized formula PI-6.

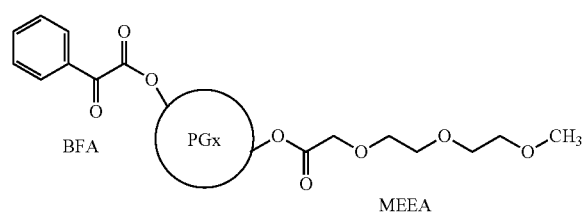

Generalized formula PI-6 wherein,

PG represents a hyperbranched polyglycidol core x represents the average number of terminal hydroxyl groups in the starting polyglycidol.

The synthesis is exemplified for the polymeric initiator $PG_{17}BFA_{10}MEEA_7$. 2.58 g (2.13 mmol) of $PG_{17}$, 2.2 mL (14.5 mmol) of MEEA and 0.69 g (3.61 mmol) of p-toluenesulfonic acid monohydrate were added into a 100 mL one-neck flask equipped with Dean-Stark and condenser. Then 40 mL of toluene was added. The mixture was heated to 136° C. and stirred for 3 hours, while water was removed azeotropically. The solvent was removed under reduced pressure. 4.11 g (25.3 mmol) of CDI was added to a solution of 3.79 g (25.3 mmol) of benzoylformic acid (BFA) in 40 mL of THF and the reaction mixture was stirred at room temperature for 3 hours. This solution was added to the flask containing the MEEA partially modified PG. After the mixture was refluxed overnight, water was added and the mixture was stirred for one hour. The solvent was removed under reduced pressure. The residue was dissolved in chloroform. The mixture was washed twice with 2N HCl aq, three times with deionized water, twice with 10% of NaOH aq and several times with NaCl aq until pH=7. The organic phase was dried over anhydrous $Na_2SO_4$. The solvent was removed under reduced pressure and the residue was dried at 40° C. under vacuum.

The products obtained are displayed in Table 13.

TABLE 13

| Polymeric Initiator | $M_n$ | Yield |
|---|---|---|
| $PG_8BFA_4MEEA_4$ | 1689 | 59% |
| $PG_{17}BFA_6MEEA_{11}$ | 3769 | 71% |
| $PG_{17}BFA_{10}MEEA_7$ | 3657 | 51% |
| $PG_{33}BFA_{9.5}MEEA_{23.5}$ | 7337 | 58% |
| $PG_{33}BFA_{17.8}MEEA_{15.2}$ | 7103 | 48% |

$^1$H NMR ($CDCl_3$): δ=0.77, 1.32 (TMP core of PG); 2.84-5.63 (protons of PG and MEEA moieties); 7.30-8.05 (proton of BFA moieties).

Example 7

The synthesis of hyperbranched polyglycidols derivatized with a α-hydroxyketone-type I photoinitiator and 2-[2-(2-methoxyethoxy)ethoxy] acetic acid as compatibilizer is described in this example. The polymeric initiators are represented by generalized formula PI-7.

Generalized formula PI-7

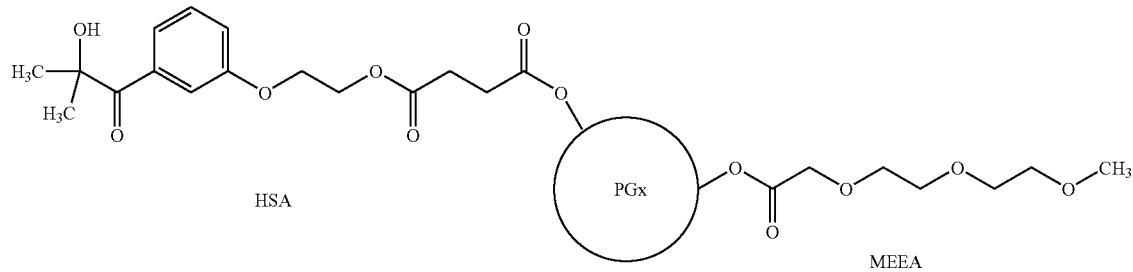

wherein,
PG represents a hyperbranched polyglycidol core
x represents the average number of terminal hydroxyl groups in the starting polyglycidol.

Synthesis of the Intermediate Photoinitiator HSA

The intermediate photoinitiator is synthesized according to the reaction scheme:

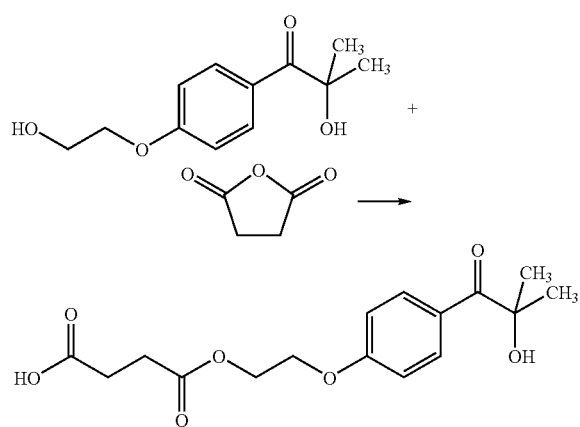

4.5 g (20 mmol) Irgacure® 2959 was suspended in 40 mL acetonitrile. 6.1 mL (44 mmol) triethyl amine and 2.2 g (22 mmol) succinic anhydride were added and the reaction was allowed to continue for 16 hours at room temperature. The solvent was removed under reduced pressure and the residue was dissolved in 50 mL water and 5 mL 1N NaOH. The mixture was extracted with 100 mL ethyl acetate. The ethyl acetate was re-extracted with 50 mL water. The pooled aqueous fractions were acidified to pH=1 with 1 N HCl and extracted twice with 100 mL methylene chloride. The pooled methylene chloride fractions were dried over anhydrous MgSO$_4$ and the solvent was evaporated under reduced pressure. The oily residue crystallized upon treatment with 20 mL hexane. 3.0 g of the succinylated initiator was obtained with a yield of 46% and a melting point of 55° C.

Synthesis of PG$_{17}$HSA$_{6.8}$MEEA$_{10.2}$ 3.08 g (2.54 mmol) of PG$_{17}$, 4.00 mL (25.9 mmol) of MEEA and 0.82 g (4.31 mmol) of p-toluenesulfonic acid monohydrate were added into a 100 mL one-neck flask equipped with Dean-Stark and condenser. Then 40 mL of toluene was added. The mixture was heated to 136° C. and stirred for 3 hours, while water was removed azeotropically. The solvent was removed under reduced pressure. At the same time the solution of 6.94 g (21.6 mmol) of HSA and 3.50 g (21.6 mmol) of 1,1'-carbonyldiimidazole (CDI) in 40 mL of THF was stirred at roomtemperature for two hours. This solution was added to the flask containing the MEEA partially modified PG. The mixture was refluxed overnight and then water was added. After removing the solvent under reduced pressure, the residue was dissolved in methanol. Pure polymer was obtained by dialysis against methanol.

The polymeric initiator PG$_{17}$HSA$_{6.8}$MEEA$_{10.2}$ was obtained with a Mn=4931 and a yield=34%. $^1$H NMR (CDCl$_3$): δ=0.77, 1.34 (TMP core of PG); 1.56 (—C(CH$_3$)$_2$—); 1.77 (—OH); 2.60 (—OOCCH$_2$CH$_2$COO—); 3.10-5.28 (protons of PG and MEEA moieties, —OCH$_2$CH$_2$O—); 6.89, 6.92, 8.02, 8.05 (proton of aromatic ring).

Having described in detail preferred embodiments of the current invention, it will now be apparent to those skilled in the art that numerous modifications can be made therein without departing from the scope of the invention as defined in the following claims.

The invention claimed is:

1. A polymeric initiator comprising a dendritic polymer core having at least one initiating functional group as an end group, wherein the dendritic polymer core is a hyperbranched polymer core, the hyperbranched polymer core being a polyglycidol, and wherein said at least one initiating functional group is an initiating functional group selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones, α-halophenylglyoxalates, benzophenones, thioxanthones, 1,2-diketones and anthraquinones.

2. The polymeric initiator according to claim 1, wherein said polymeric initiator has at least five initiating functional groups as end groups on the dendritic polymer core.

3. The polymeric initiator according to claim 1, wherein said dendritic polymer core has at least one other functional group as an end group.

4. The polymeric initiator according to claim 3, wherein said one other functional group is a compatibilizing group to improve the compatibility of the polymeric initiator with a radiation curable composition.

5. The polymeric initiator according to claim 1, wherein said hyperbranched polymer core has a polydispersity $M_w/M_n$ smaller than 3.

6. The polymeric initiator according to claim 1, wherein said polymeric initiator has at least seven initiating functional groups as end groups on the dendritic polymer core.

7. A process for manufacturing a polymeric initiator comprising the steps of:
   a) providing a dendritic polymer core, and
   b) attaching at least one initiator or initiator derivative to said dendritic polymer core as an end group,
      wherein the dendritic polymer core is a hyperbranched polymer core, the hyperbranched polymer core being a polyglycidol, and wherein said at least one initiator or initiator derivative is selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones, α-halophenylglyoxalates, thioxanthones, 1,2-diketones and anthraquinones.

8. The process according to claim 7, wherein said hyperbranched polymer core has a polydispersity $M_w/M_n$ smaller than 3.